United States Patent [19]

Joel, Jr.

[11] 3,916,124

[45] Oct. 28, 1975

[54] NODAL SWITCHING NETWORK ARRANGEMENT AND CONTROL

[75] Inventor: Amos Edward Joel, Jr., South Orange, N.J.

[73] Assignee: Bell Telephone Laboratories, Incorporated, Murray Hill, N.J.

[22] Filed: Aug. 31, 1973

[21] Appl. No.: 393,595

[52] U.S. Cl. ........................ 179/18 GE; 179/18 GF

[51] Int. Cl.[2] ........................................... H04Q 3/56

[58] Field of Search....... 179/18 GF, 18 GE, 18 EA, 179/186 F, 186 E

[56] References Cited

UNITED STATES PATENTS

| | | | |
|---|---|---|---|
| 2,927,970 | 3/1960 | Blow | 179/18 AD |
| 3,542,970 | 11/1970 | Westfall et al. | 179/22 |
| 3,705,523 | 12/1972 | Alouisa | 179/18 EA |
| 3,794,983 | 2/1974 | Sahin | 340/172.5 |

FOREIGN PATENTS OR APPLICATIONS

| | | | |
|---|---|---|---|
| 1,110,367 | 3/1966 | United Kingdom | 179/186 E |

*Primary Examiner*—Kathleen H. Claffy
*Assistant Examiner*—C. T. Bartz
*Attorney, Agent, or Firm*—H. R. Popper

[57] ABSTRACT

A switching network and control apparatus therefor are disclosed which permits equi-interconnectability amongst terminations in establishing a connection path between a calling and called termination. A count is accumulated showing the busyness of available links at each of the intermediate switching nodes and circuitry is provided for choosing minimal length paths when these paths are available and for selecting alternate paths when the shortest paths are busy. Connections may be established in the direction from the calling to the called terminations, or from the called to the calling terminations.

24 Claims, 23 Drawing Figures

9 x 6 SECTION OF ARRAY 21

SCAN COUNTER MEMORY MAP, ROW HALF-COUNT OF BUSY LINKS →

| | x = 0 | | | | | | | | x = 8 |
|---|---|---|---|---|---|---|---|---|---|
| y = 6 | 7 | 6 | 5 | 4 | 3 | 2 | 1 | 0 | 0 |
| | 3 | 3 | 3 | 3 | 3 | 3 | 2 | 1 | 0 |
| | 2 | 2 | 2 | 2 | 2 | 2 | 1 | 1 | 0 |
| | 11 | 10 | 9 | 8 | 7 | 6 | 4 | 3 | 1 |
| | 2 | 2 | 2 | 2 | 2 | 2 | 1 | 1 | 0 |
| | 9 | 8 | 7 | 6 | 5 | 4 | 2 | 1 | 0 |
| y = 0 | 1 | 1 | 1 | 1 | 1 | 1 | 0 | 0 | 0 |

SCAN COUNTER MEMORY MAP, COLUMN HALF-COUNT OF BUSY LINKS ↓

| | x = 0 | | | | | | | | x = 8 |
|---|---|---|---|---|---|---|---|---|---|
| y = 6 | 1 | 1 | 1 | 1 | 1 | 1 | 1 | 0 | 0 |
| | 1 | 1 | 1 | 1 | 1 | 2 | 2 | 1 | 0 |
| | 1 | 1 | 1 | 1 | 1 | 3 | 2 | 1 | 0 |
| | 2 | 2 | 2 | 2 | 2 | 5 | 3 | 3 | 1 |
| | 2 | 2 | 2 | 2 | 2 | 6 | 3 | 4 | 1 |
| | 3 | 3 | 3 | 3 | 3 | 8 | 4 | 5 | 1 |
| y = 0 | 3 | 3 | 3 | 3 | 3 | 9 | 4 | 5 | 1 |

SCAN COUNTER MEMORY MAP, COMBINED HALF-COUNT

| | x = 0 | | | | | | | | x = 8 |
|---|---|---|---|---|---|---|---|---|---|
| y = 6 | 8 | 7 | 6 | 5 | 4 | 3 | 2 | 0 | (0) |
| | 4 | 4 | 4 | 4 | 4 | 5 | 4 | 2 | (0) |
| | 3 | 3 | 3 | 3 | 3 | 5 | 3 | 2 | (0) |
| | 13 | 12 | 11 | 10 | 9 | 11 | 7 | 6 | (2) |
| | 4 | 4 | 4 | 4 | (4) | (8) | (4) | (5) | (1) |
| | 12 | 11 | 10 | 9 | (8) | 12 | 6 | 6 | 1 |
| y = 0 | (4) | (4) | (4) | (4) | (4) | 10 | 4 | 5 | 1 |

NODAL SWITCHING NETWORK ARRANGEMENT AND CONTROL

BACKGROUND OF THE INVENTION

This invention relates to switching networks and more particularly to networks in which extension of a connection path from one termination or node in the network to another is controlled by a central or common control apparatus. It is an object of the present invention to provide a switching network which requires less rearrangement as the traffic assigned to the network terminations is altered and which is more easily enlargeable to include more network terminations than the prior art switching networks.

Heretofore, network design has proceeded using multistage designs where line and/or trunk terminations appear only on the stages at one or both ends. The theory of multistage networks that do not block calls was enunciated by C. Clos in the March 1953 issue of the Bell System Technical Journal. Clos shows, for example, that for an array serving to effect connections amongst N lines, a three-stage will provide fewer crosspoints than a comparable single stage or square array, where N is equal to or larger than 36. The number of crosspoints in such networks may be further reduced, but this introduces blocking, that is, under load conditions some desired connections cannot be established. Under either the blocking or nonblocking criteria it has always been a design objective of multistage networks that the least-crosspoints-equals-the-highest efficiency. Multistage networks have been designed and used for many years and have given adequate service. However, these prior art multistage switching networks designed from the standpoint of crosspoint efficiency suffer from two principal drawbacks which arise from the fact that terminations must be grouped and assigned to switches at the input and output stages of the network. The grouping of terminations at switches means that the traffic load offered at each termination must be taken into account and often requires that termination assignments be changed to achieve traffic balance through the network. The reassignment of terminations is an inconvenient and expensive procedure. Furthermore, when the need arises to expand existing multistage networks the growing pains become severe because networks are not linearly growable to accommodate small increments of new terminals and in addition when the indicated switch banks or bays are added, most of the interstage connections must be altered if the efficiency of crosspoints is to be maintained.

SUMMARY OF THE INVENTION

I have discovered that an improved type of switching network may be obtained if the network is made so that each termination is very nearly equi-interconnectable in the network with every other termination served by the network. Further in accordance with one aspect of my invention, connections between calling and called terminations may be made in an efficient manner by forming a scratch pad map of the nodes of the equi-interconnectable array subtended by the coordinates of the calling and called nodes. Into the cells of the scratch pad map, there being one cell in the map for each switching node in the array, is entered an indication of the degree of link occupancy of the links offered by the node and, advantageously, of the link occupancy of the nodes in the rows and columns of the array beginning at either the calling or called node and progressing, respectively, to the called or calling node. Linkages are then selected by the common control consulting the scratch pad map and selecting the idle link to the next node in the path which next node has at least one idle link in the direction of the destination, the destination being the called node when connections are being set up from the calling node and the direction of occupancy of rows and columns being cumulatively incremented in the formation of the scratch pad map starting from the called node and progressing toward the calling node.

Further in accordance with an aspect of my invention, I provide for the selection of a regressive link, i.e., an idle link not leading to a node in the immediate direction of the destination in the event that it is impossible to select a node that does lead in the direction of the destination because all of the links of that node are completely occupied.

DESCRIPTION OF THE DRAWINGS

The foregoing and further objects and features of my invention will become more apparent by referring now to the drawing in which:

FIGS. 5 through 12 are to be arranged.

GENERAL DESCRIPTION

Figure 1:
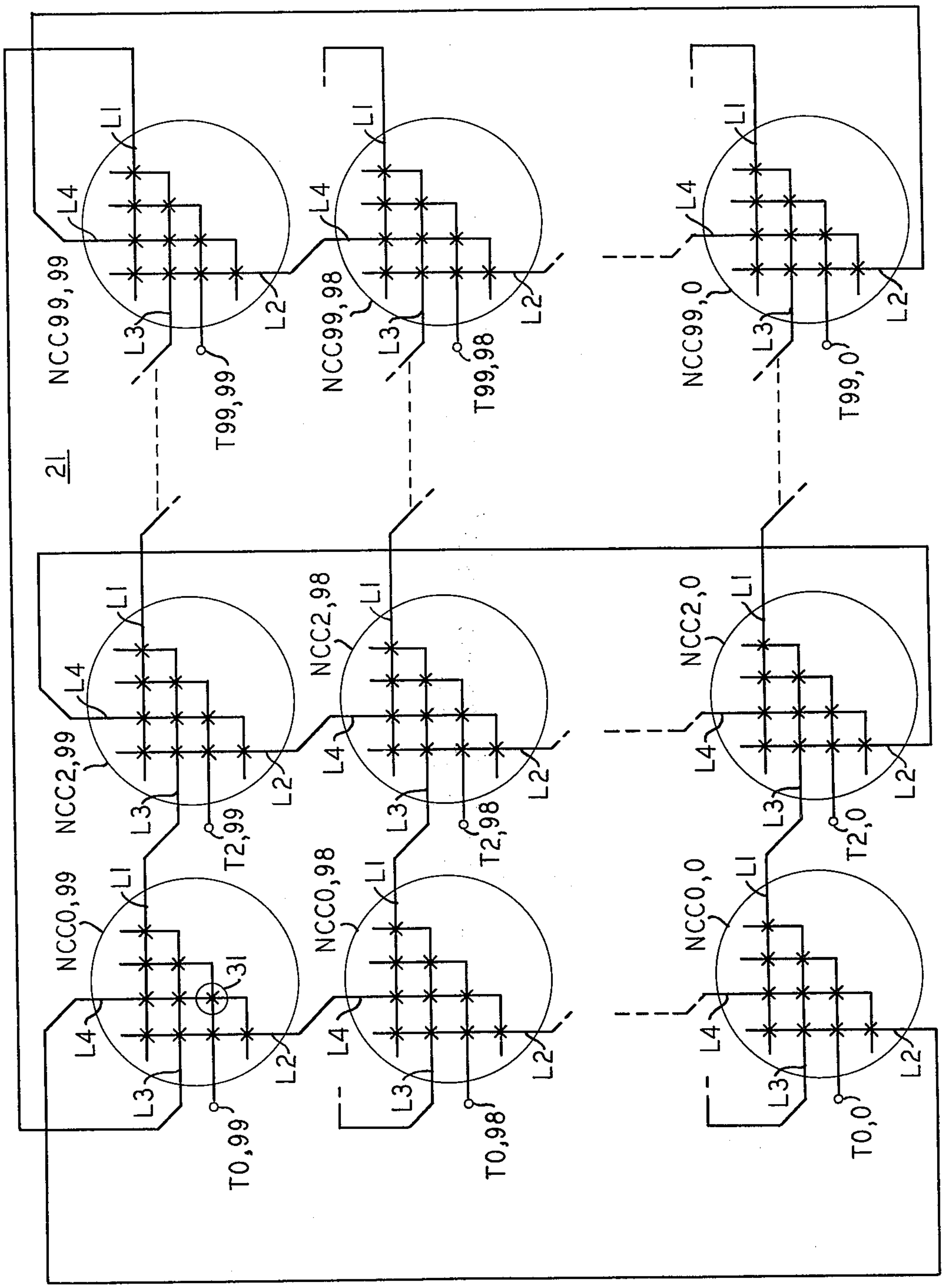
FIG. 1 shows a simplified equi-interconnectable array of switching nodes arranged on a bidirectionally convoluted plane.

Referring now to FIG. 1 there is shown a simple example of an equi-interconnectable array 21 of switching nodes. The switching array may form part of a telephone system, as in FIG. 2. Each switching node of array 21 is implemented through the use of a nodal crosspoint configuration (NCC-,-). Each NCC is a wire center or at least a switching entity at which calls may originate, terminate or are switched through the node. Calls may originate or terminate at the associated termination terminal T-,- of each NCC.

Figure 3:
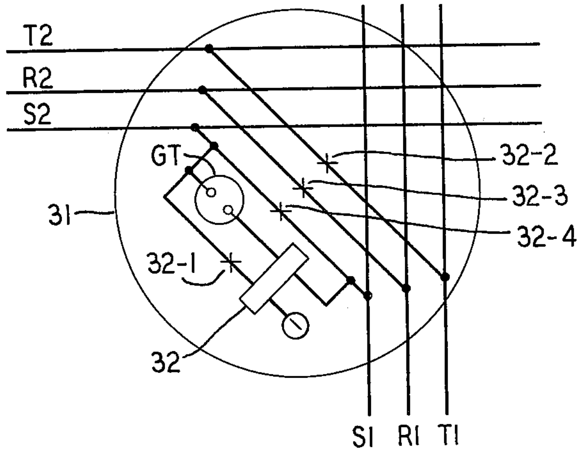
FIG. 3 shows a crosspoint of a switching node of the network of FIG. 1.

The details of one of the ten crosspoints 31 present at each NCC of network 21 of FIG. 1 are shown in FIG. 3. Each crosspoint 31 includes a double winding relay 32 that controls a make contact 32-2, 32-3 and 32-4 for interconnecting, respectively, "horizontal" tip, ring, and sleeve conductors T, R, and S with "vertical" tip, ring, and sleeve conductors T1, R1, and S1. The functioning of such a three-wire crosspoint is well understood in the art.

For simplicity of presentation and so that the nodal crosspoint configurations can be identified using Cartesian coordinates, switching array 21 is shown as if it were contained in a single plane. Thus, the lower left-most nodal crosspoint configuration is denoted NCC0,0 and the upper-most NCC at the right is designated NCC99,99, it being assumed that there are 10,000 NCCs represented. Although, as will be hereinafter mentioned, each of the nodal crosspoint configurations may be connected to its neighbor nodes in a deterministic manner, for the sake of most succinctly illustrating the principles of the present invention, each NCC is connected in a similar manner with the same number of neighboring NCCs, there being one link connecting each NCC to its neighbor. For the sake of uniformity, links will be designated at the end incoming to each NCC. Thus, in the center of array 21, NCC2,98 has its link incoming from NCC2,99, which is above, designated as link L4; its link incoming over the dotted path to the right designated as L1, its link incoming over the dotted path from below as L2, and its link incoming from NCC0,98 at the left designated L3.

It is apparent by inspection of FIG. 1 that between any two terminations, T00 and T99,99 there are many possible paths that could be constructed utilizing different ones of the intervening NCCs. The network of FIG. 1 is, accordingly, immediately seen to be different than the conventional switching network in which great pains are usually taken to employ a plurality of equal length paths through a fixed number of switching stages. Network 21, as will hereinafter be more fully explained, contains a great variety of possible paths of different length that can be constructed between calling and called nodes as well as a reasonable number of different minimum length paths. The control mechanism for constructing these paths will initially attempt to select one of the possible minimum length paths between the calling and called terminations and, if this is not possible, will attempt to establish a nonminimum length path.

As was previously mentioned, the nodal crosspoint configurations, NCCs, have been shown in a single plane and, indeed, NCCs composed of conventional relay crosspoints would be physically mounted on racks while NCCs fabricated of solid state crosspoints would most likely be mounted on planar plug-in cards. Nevertheless, the left-most and right-most NCC of each row of the network 21 are interconnected by means of their respective links L3 and L1 and the upper-most and lower-most NCC of each column are interconnected by means of their links L4 and L2, respectively. Properly, therefore, the network of FIG. 1 is a "re-entrant" or convoluted planar array, i.e., closed upon itself and could, at least conceptually, be physically implemented in a more or less donut shape.

With the simple type of NCC shown in FIG. 1, each NCC is associated with a respective termination terminal T which may be connected to any one of the four links L1 through L4 at the NCC. Two simultaneous connections are possible at each NCC of network 21. These may employ all four links, as in the case where the NCC is merely being used as a switching-through point to carry connections between two pairs of neighbor nodes, or three links may be used, in which case one pair of links uses the node as a switching-through point and the third link connects the associated termination terminal T-,- to a neighbor node. Generally speaking the number of noninterfering simultaneous connections through an NCC is given by the integer value obtained by dividing the number of links at the node by 2.

Figure 2:
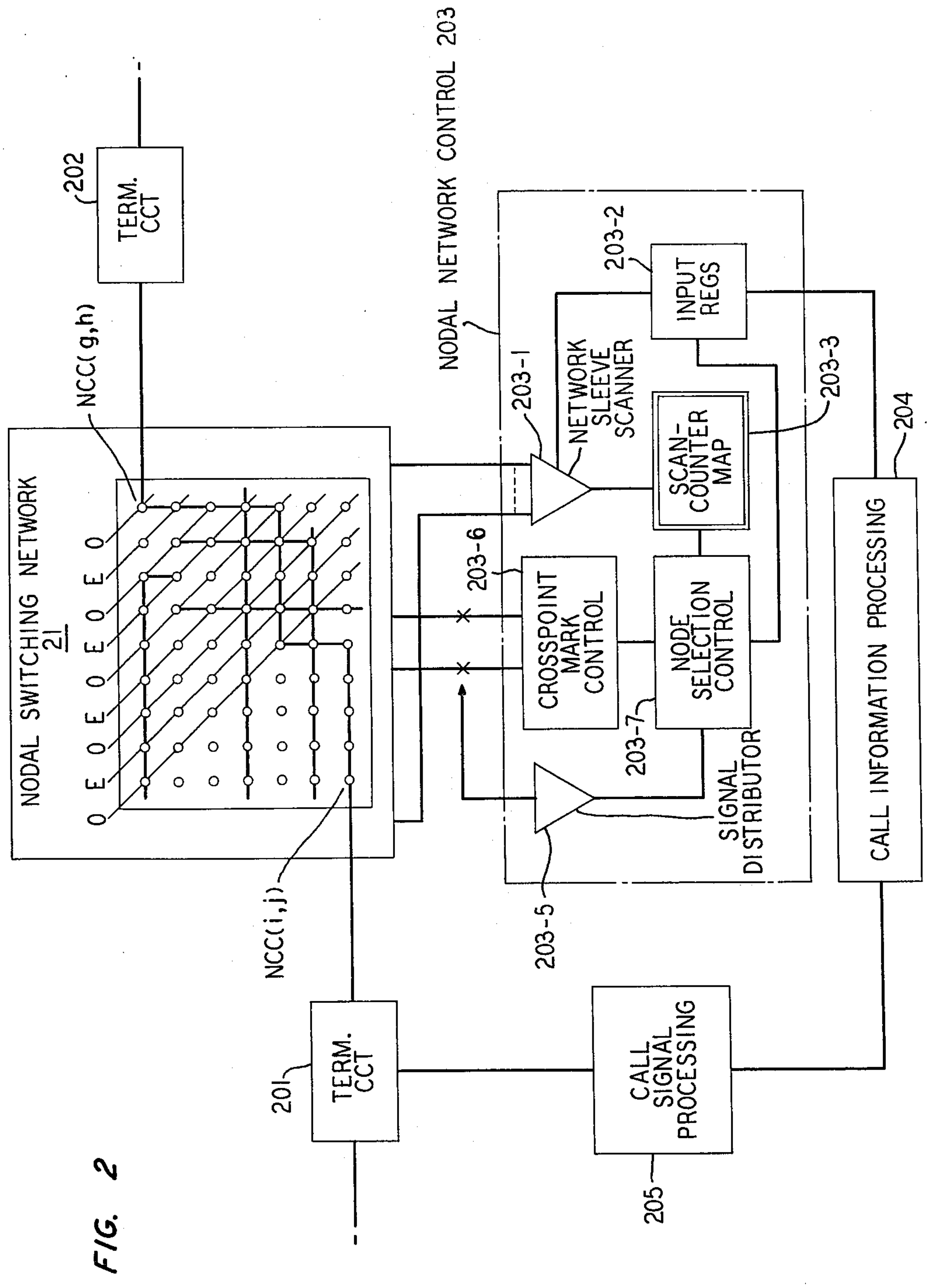
FIG. 2 shows in block diagram form my control arrangement for establishing paths through the network of FIG. 1.

The network 21 of FIG. 1 is shown again in FIG. 2 but in more highly schematicized form. A connection path is shown extending between a calling termination circuit 201 associated with NCC23,55 and a called termination circuit 202 associated with NCC71,30. It should be apparent that circuits 201 and 202 may be lines, trunks, or service circuits.

To further simplify the figure and so as to focus on the operation and arrangement of the elements of network control 203 which are unique to my invention, I have represented conventional telephone office apparatus at 204 and 205 by employing the universal symbolism described in my article entitled "The Classification and Unification of Switching System Functions" published in the International Switching Symposium Record, June 1972. Both the call information processing apparatus 204 and call signal processing apparatus 205 may advantageously be comprised of the prior art devices employed in the No. 1 Electronic Switching System described in the September 1964 issue of the Bell System Technical Journal. Call information processing apparatus 204 furnishes to nodal network control 203 information regarding the originating and terminating termination circuits 201, 202 and in turn receives the address of the terminating terminal circuit 202 from the call signal processing apparatus 205.

Nodal network control 203 is comprised of six principal parts. Electronic scanner 203-1 is a prior art device for scanning lines or links. It is connected to monitor the sleeve leads of the links between the nodes of network 21 so that when the address of a node is entered into input registers 203-2, scanner 203-1 will enter the busy-idle state of the links associated with that node into scan counter memory map 203-3. Scanner 203-1 is shown separately as part of nodal network control 203 because it is used, as will hereinafter be more fully described in detail, in a different manner and to achieve different ends than the scanners in prior art switching systems.

Briefly, however, scanner 203-1 will ascertain which links at particular nodes are busy and in addition, will enter into scan counter map 203-3 counts of the cumulative total of busy links present at the nodes in predetermined rows and columns of nodes in network 21. This function of maintaining a count of the "busyness" of predetermined nodes and, more particularly, of predetermined nodes lying between the coordinates of the calling and called nodes is unique to the operation of my invention in selecting a network path and will be described hereinafter in great detail.

Figures 4, 4A, 4B:
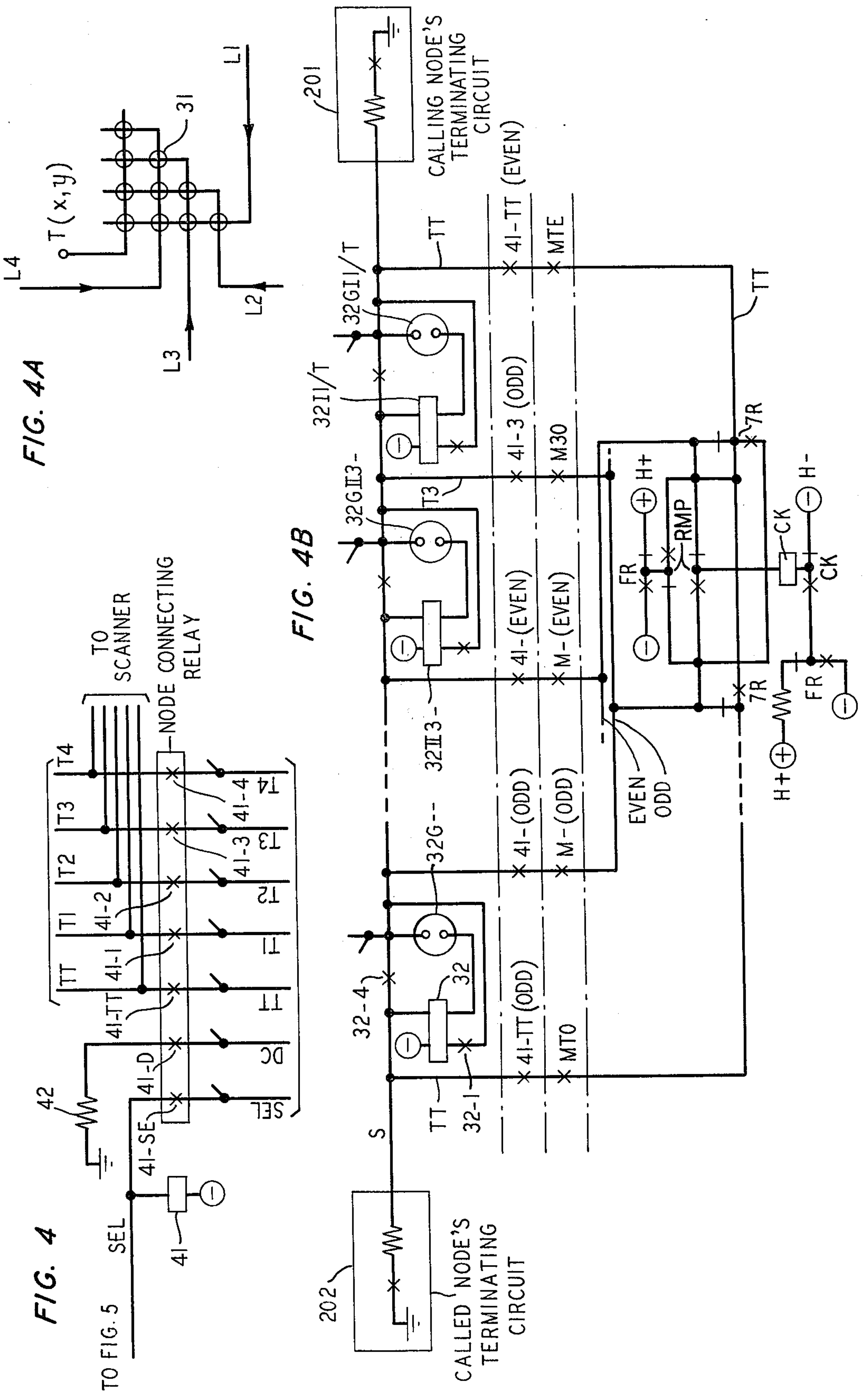
FIG. 4 shows a typical node connecting relay.
FIG. 4A shows the link numbering at a switching node.
FIG. 4B shows the application of marking potentials to a switching path.

Signal distributor 203-5 operates the connector relays of FIG. 4 there being one such connector relay for every NCC in network 21. The signal distributor 203-5 as well as the winding of the connector relay 41 of FIG. 4 may also advantageously be of the same type as the signal distributor and relays windings operated thereby in the above-mentioned No. 1 ESS article.

Crosspoint mark control circuit 203-6 actuates the crosspoints of the NCCs that will enable the path to be set up in network 21 between termination circuits 201 and 202 in accordance with information received from node selection control circuit 203-7. The crosspoint mark control circuit 203-6, as more fully described in connection with FIG. 7, obtains access, via a respective connecting relay (FIG. 4), to the sleeve leads of an intermediate NCC to which the connection was extended in network 21 as well as to the next NCC which is to be included in the path. By applying a negative potential to the sleeve lead of the link at the next node end of the link, the connection is extended to this next node by operating the crosspoint in the first, or key, node. A positive potential will have already been applied to hold the link path that has been established to the key node. The crosspoint mark control circuit 203-6 repeats the process as each new node is added to build up the connection path, but reverses the link holding and marking potentials between selections. Considering network 21 to be arranged in a rectangular plane of nodes positioned so as to have discrete Cartesian coordinate addresses, the "diagonals" of the network may be classified sequentially as even and odd so that the polarity of the link holding and marking potentials which is employed may be determined incident to the actuation of the crosspoints of the nodes. Thus, depending upon whether the nod having its crosspoint then actuated is classified as being on an even or odd diagonal it will be supplied by circuit 203-6 with respectively, a positive or negative marking potential.

Node selection control circuit 203-7 contains the logic circuitry for enabling a path to be selected through network 21 between a called and calling termination circuit. With the aid of signal distributor 203-5 and the node connecting relays, FIG. 4, node selection control circuit 203-7 examines scan counter map 203-3 and the link busy-idle conditions, and employs its internal selection logic circuitry to determine which crosspoints in network 21 are to be operated. Node selection control circuit 203-7 operates incident to the setting up of each intermediate link between the calling and called NCCs.

Figures 2A, 2B, 2C, 2D:
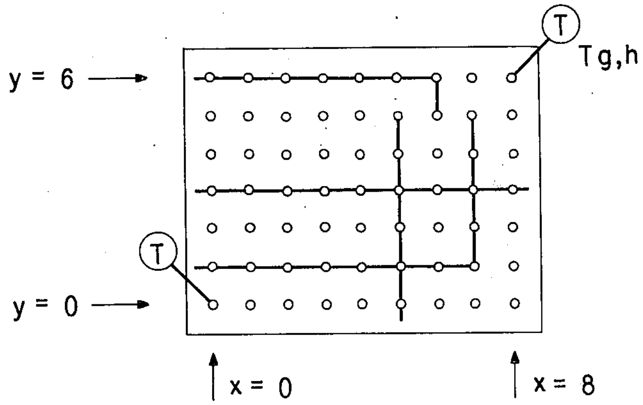
FIG. 2A shows a section of array 21 taken between calling and called nodes.
FIGS. 2B through 2D show the contents of the memory cells of the scan counter memory map corresponding to the network section of FIG. 2A.

An overview of the operation of scan counter memory map 203-3 may be most easily obtained by referring now to FIGS. 2A through 2D. In FIG. 2A is shown a 9 by 7 section of network 21 with some connections already existing therein. For example, beginning at the right in the top row of the section (ordinate Y = 6) the horizontal links between each of NCCs 6,6 through NCC 0,6 are seen to be busy. Similarly, in the center row (ordinate Y = 3) all of the horizontal links between NCC 8,3 and NCC 0,3 are seen to be occupied. In vertical column (abcissa X = 5) the vertical links between NCCs 5,5 through 5,0 are busy on one connection and that of NCC 5,6 is busy on another.

Figure 5:
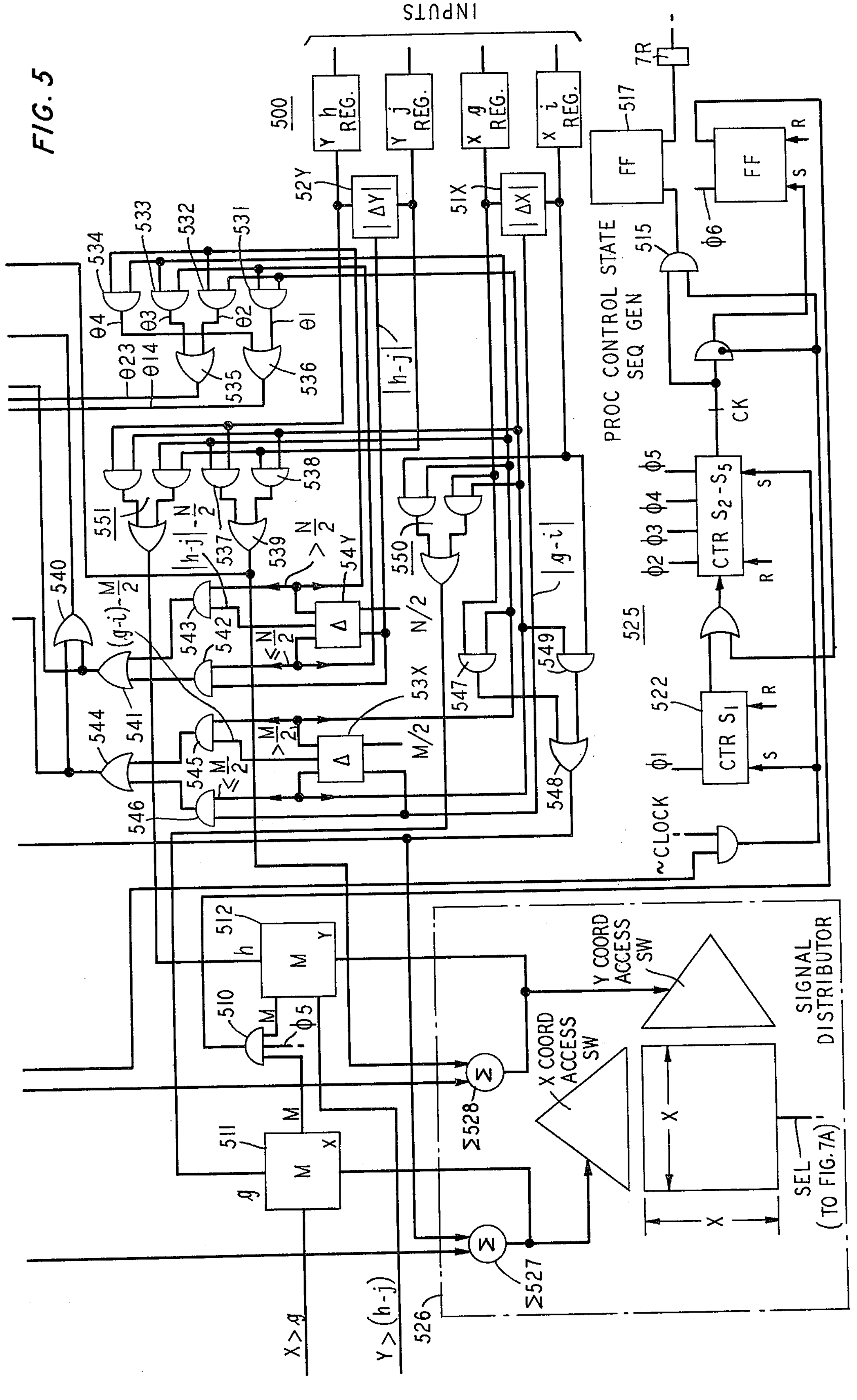
FIG. 5 shows the details of the signal distributor, input registers, and process control state sequence generator.
Figure 6:
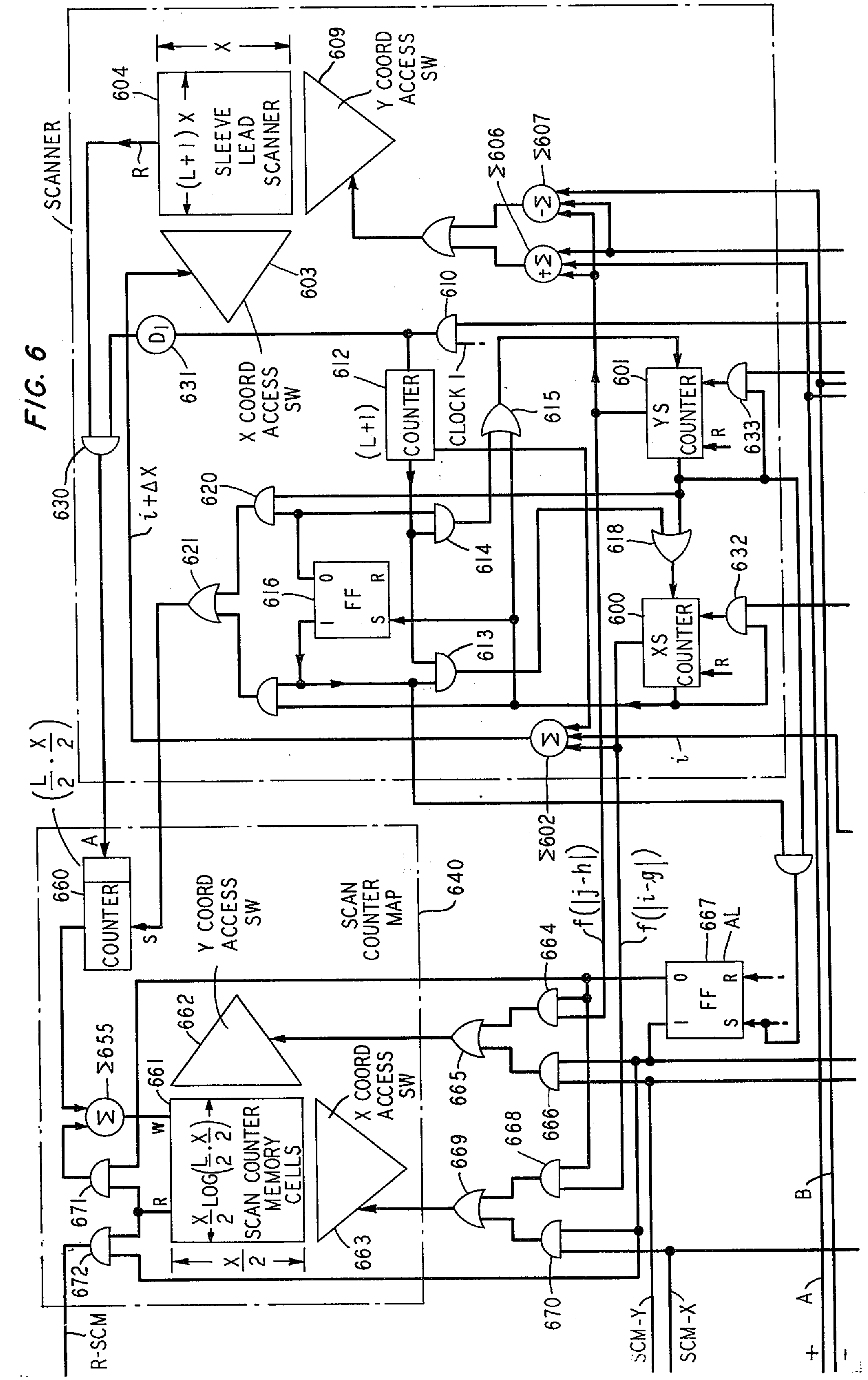
FIG. 6 shows the sleeve lead scanner and scan counter memory map.
Figure 7:
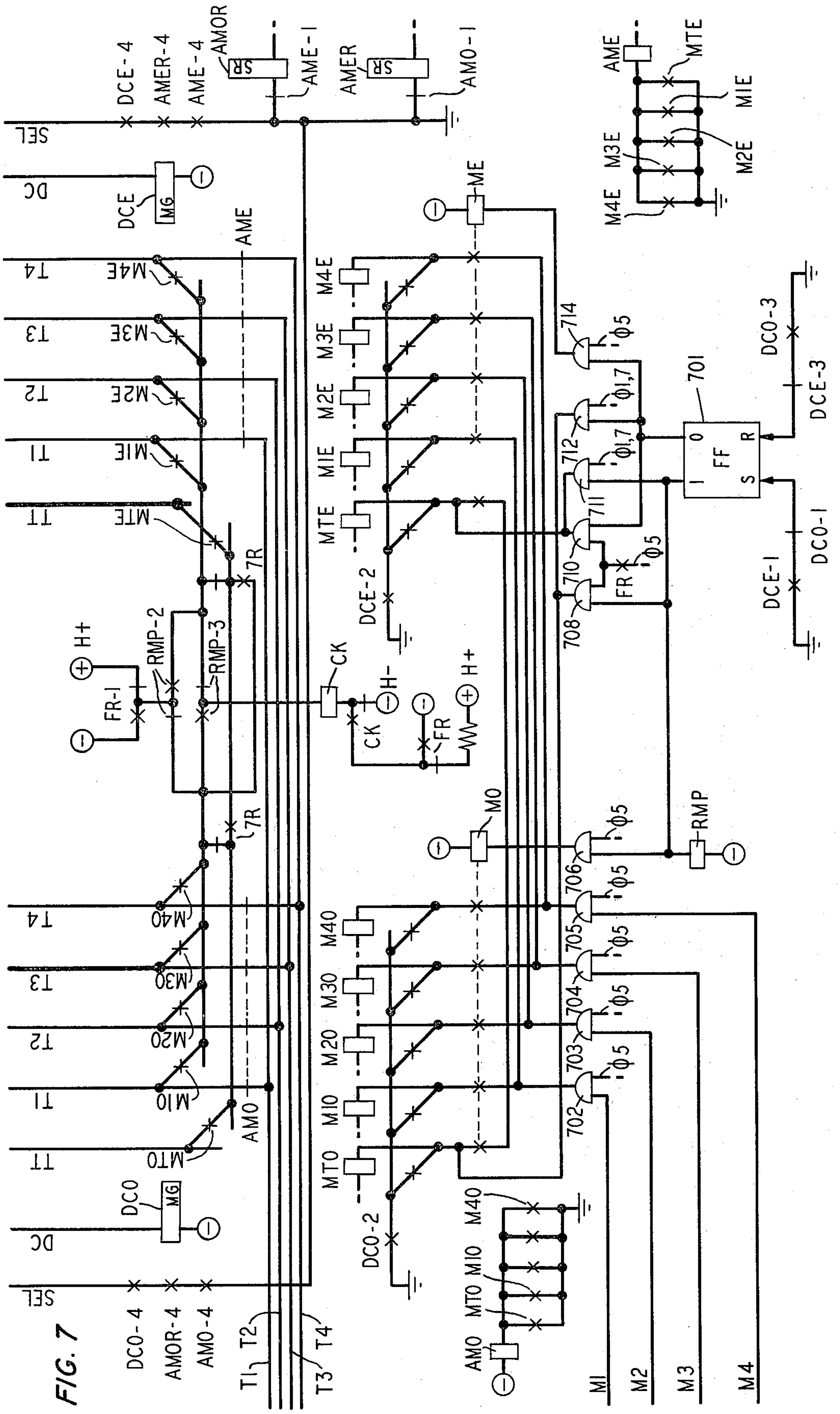
FIG. 7 shows the details of the crosspoint marking control circuit.

In accordance with the operation of the control logic of my invention, shown in detail in FIGS. 5, 6, and 7, counts are placed in the memory cells of scan counter memory map 203-3 which are cumulative half-counts of the number of busy links at each node in the rows and columns of nodes beginning at the called node and progressing toward the calling node. Thus, the count numbers shown in the rows of memory cells of the scan counter map in FIG. 2B represent the cumulative count (divided by two) of busy links at each node of the row, beginning at NCC 8,6 associated with called termination terminal T8,6 and going in the direction of calling node NCC 0,0 associated with termination terminal T0,0.

The scan counter memory map of FIG. 2B may be thought of as a replica of the 9 by 7 section of array 21 pictured in FIG. 2A. Consider first the top-most row (ordinate Y = 6) beginning at termination terminal T8,6. No links are in use at either node NCC 8,6 or at NCC 7,6 and so at the coordinates 8,6 and 7,6 of scan counter memory map in FIG. 2B a zero is entered. At NCC 6,6 the horizontal link to NCC 5,6 and the vertical link to NCC 6,5 are in use. Accordingly, at coordinates 6,6 of the scan counter memory map of FIG. 2 a half-count of links so far found to be busy (2/2 = 1) is entered. At NCC 5,6 the links to NCC 4,6 and to NCC 6,6 are in use. The cumulative total of busy links up to point 5,6 (1+2/2 = 2) is entered at the coordinates 5,6 in scan counter memory map FIG. 2B. In similar fashion, and progressing leftward down the remainder of row Y = 6 two additional links are found to be in use in each NCC and therefore (2/2 = 1) is added to the cumulative total of busy links at each new coordinate in the top row of FIG. 2B.

The procedure thus described for the top rows of FIGS. 2A and 2B is next repeated for the next-to-the-top rows of FIGS. 2A and 2B. At the completion of this operation the memory cells in the rows of FIG. 2B contain numbers which increase in magnitude from right to left reflecting the busyness of row paths.

Next, a scan is made of the columns of the section of array 21 set forth in FIG. 2A and numbers are entered at the coordinates of FIG. 2C which correspond to those of FIG. 2A to reflect a cumulative half count of links found to be busy in each column beginning at the column of the called node 8,6 and progressing leftward toward the column of the calling node 0,0.

FIG. 2D represents the results of superimposing and adding the counts of FIG. 2B to those of FIG. 2C. It is immediately apparent by inspecting FIG. 2D that the cumulative totals increase from right to left and from top to bottom so that the nodes in the immediate vicinity of calling node 0,0 reflect at the calling node a "prediction" of the "busyness" of links that would be encountered for a path to be constructed from the calling node and going through the nodes having the combined half-count numbers in FIG. 2D. Thus, starting at calling node NCC 0,0, we see that a path toward the called node may be taken via node NCC 0,1 which has a count of 12 or via node NCC 1,0 which has a count of 4. Obviously, the latter node should be preferred since it predicts a busyness for a path through it that is much less than that predicted for the other node. In accordance with my invention the logic circuitry of FIGS. 5 through 12 selects the path having the prediction of least busyness.

Before finally choosing the node with the smaller count, a test is made of links leaving NCC 1,0 in the direction of the called node. If the node has at least one idle outgoing link, the node is chosen. A network order is now generated to actuate the appropriate crosspoint at NCC 0,0 to extend the connection to NCC 1,0.

The process is now repeated at node NCC 1,0 looking toward nodes NCC 2,0 (having a cumulative half-count prediction of 4) and toward NCC 1,1 (having a cumulative half-count prediction of 11). In this manner a path is constructed from the calling node in the direction of the called node which passes the NCCs at coordinates 0,0; 1,0; 2,0; 3,0; 4,0; 4,1; 4,2; 5,2; 6,2; 7,2; 8,2; 8,3; 8,4; 8,5; 8,6.

Figure 2E:
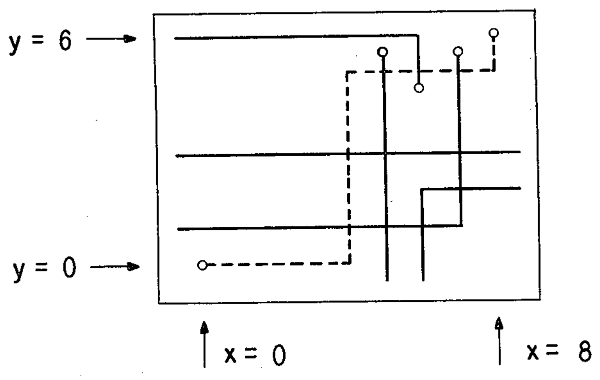
FIGS. 2E and 2F respectively, show the section of array 21 and the scan counter memory map under heavier traffic conditions.
Figure 2F:
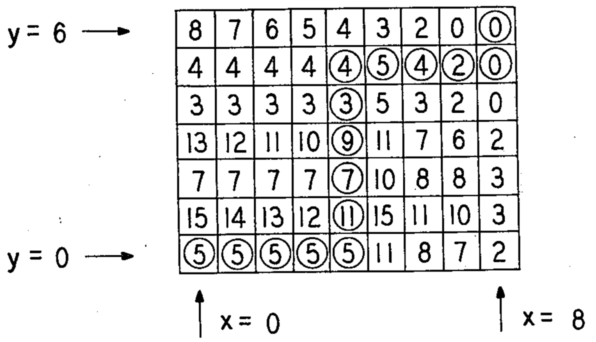

To more clearly illustrate the "look ahead" feature of the path selection arrangement of my invention reference may be had now to FIGS. 2E and 2F. FIG. 2E shows the same 9 by 6 section of array 21 as was portrayed in FIG. 2A with the exception that some additional linkage paths have been set up in the lower right-hand corner. FIG. 2F shows the contents of the memory cells of the scan counter memory map obtained by forming the cumulative half counts of busy links at the rows and columns of nodes from the called node to the calling node. Commencing at the calling node it is seen that the two next nodes that could be selected are, as in the case of FIGS. 2A and 2D, the nodes at 0,1 and 1,0. These nodes have cumulative link busyness counts of 15 and 5, respectively, and so, as before the first node selected will be NCC 1,0.

The connection proceeds from the calling node in the same manner as described for FIGS. 2A and 2D until NCC 4,0 is selected. At this point, it is noted that the next two possible nodes at 4,1 and 5,0 each have a busyness count of 11. In accordance with the operation of the path selection arrangement of my invention, a random choice can be made since both nodes have idle outgoing links in the direction of the called node. If the node at NCC 5,0 is selected, the remainder of the path toward the called node is 5,0; 6,0; 7,0; 8,0; 8,1; 8,2; 8,3; 8,4; 8,5; 8,6.

If at node 4,0, the random selection had dictated the path go to NCC 4,1, the ramainder of the path selected would progress to NCC 4,5 via NCCs at 4,1; 4,2; 4,3; 4,4; 4,5. At NCC 4,5 it is apparent from FIG. 2F that NCC 4,6 has a busyness count of 4 while NCC 5,5 has a busyness count of 5. Nevertheless, the latter node is selected inasmuch as the outgoing link from NCC 4,6 toward the called node is busy.

From the above brief description, it is seen that in the operation of the path selection arrangement of my invention a path is extended from the current node to that node in the direction of the called node which has the lower figure of busyness and which has an idle outgoing link in the required direction.

In the foregoing example, it was assumed that the called node was located to the right of and above the calling node. In general, there is an arbitrary origin 0,0 and N nodes per column and M nodes per row. The calling node has the coordinates $i$, $j$, and the called node the coordinates $g$, $h$.

In the foregoing example, it was also assumed that the distance from column $i$ to column $g$ was less than the distance from column $g$ to column $i$, that is $$|g-i| \leq \frac{M}{2}.$$

In this case the direction of row scanning would be from $g$ to $i$ over all the rows. The direction of scanning of columns was from $h$ toward $j$ over all columns from $g$ toward $i$, since it was assumed that the distance from row $j$ to $h$ was less than the distance from row $h$ to row $j$ $$\left(|h-j| \leq \frac{N}{2}\right).$$

Had the distance between row $h$ and row $j$ been the smaller ( $|h-j| > N/2$), then the direction of column scanning is from $j$ to $h$ over all of the applicable columns. There are four possible orientations ($\theta 1 - \theta 4$) of the relationship between the calling termination $(i,j)$ and the called termination $(g,h)$. These are as follows:

| | | | | |
|---|---|---|---|---|
| Θ1. | $\lvert g-i \rvert \leq$ | $M/2$ | and | $\lvert h-j \rvert \leq N/2$ |
| Θ2. | $\lvert g-i \rvert \leq$ | $M/2$ | and | $\lvert h-j \rvert > N/2$ |
| Θ3. | $\lvert g-i \rvert >$ | $M/2$ | and | $\lvert h-j \rvert \leq N/2$ |
| Θ4. | $\lvert g-i \rvert >$ | $M/2$ | and | $\lvert h-j \rvert > N/2$ |

For purposes of describing the illustrative embodiment of this invention these may be reduced to two cases, (A) and (B). This is accomplished by interchanging the calling and called terminations for two orientations, i.e., in half of the orientations the connections are built-up from calling to called termination, and in the other half they are treated identically but the connection would be established from the called termination to the calling termination. Orientations $\theta 1$ and $\theta 4$, and $\theta 2$ and $\theta 3$ then become identical cases which will be identified as cases (A) and (B) respectively. For the sake of simplifying the description, only the cases where connections are established from the calling to the called node are referred to hereinafter and these are orientations 1 and 2.

The foregoing example of a path selection has also assumed that network busyness was always such as to provide a next node in the direction of the called node. It is conceivable that on occasion the current node will not have an idle link available to either "next" node in the immediate direction of the called node. In this case the busyness counts in memory cells of the memory map are examined in what may be termed a "regressive" direction. Stated generically, if the path has proceeded to the current node having coordinates $x,y$ and neither the node at $x + 1,y$ and $x,y + 1$ may be selected because the links in the direction of these nodes are busy, the memory cells for nodes at coordinates $x - 1,y$ and $x,y \pm 1$ (for cases (A) or (B), respectively) will be examined for the smallest busyness counts. Links will be selected and the path established to whichever of these nodes has an idle outgoing link in the direction of the called node.

When the connection is extended as far as NCC 8,2, no test will ordinarily be made of the "next" node at 9,2 since the abcissa of this node exceeds in magnitude the abcissa of the called node at 8,6. If, however, the link from 8,2 to 8,3 is busy, the arrangement of my invention would test the "regressive" path to NCC 9,2 to see if that NCC had an idle outgoing link in the direction of the called NCC at 8,6. The various possibilities of network connections are summarized in Table I:

TABLE I

| Condition | Select for Next Node: | At Next Node, Test Links: Access | Outgoing | Regress |
|---|---|---|---|---|
| A In Range Case(A) | II(X+1,Y) | L3 | L1, L4 | L2 |
| | III(X,Y+1) | L2 | L1, L4 | L3 |
| B In Range Case(B) | II(X+1,Y) | L3 | L1, L2 | L4 |
| | III(X,Y−1) | L4 | L1, L2 | L3 |
| C X Out of Range Case(A) | II(X−1,Y) | L1 | L3, L4 | L2 |
| | III(X,Y+1) | L2 | L3, L4 | L1 |
| D X Out of Range Case(B) | II(X−1,Y) | L1 | L2, L3 | L4 |
| | III(X,Y−1) | L4 | L2, L3 | L1 |
| E Y Out of Range Case(A) | II(X+1,Y) | L3 | L1, L2 | L4 |
| | III(X,Y−1) | L4 | L1, L2 | L3 |
| F Y Out of Range Case(B) | II(X+1,Y) | L3 | L1, L4 | L2 |
| | III(X,Y+1) | L2 | L1, L4 | L3 |
| G X,Y Out of Range Case(A) | II(X−1,Y) | L1 | L2, L3 | L4 |
| | III(X,Y−1) | L4 | L2, L3 | L1 |
| H X,Y Out of Range Case(B) | II(X−1,Y) | L1 | L3, L4 | L2 |
| | III(X,Y+1) | L2 | L3, L4 | L1 |

Figure 2G:
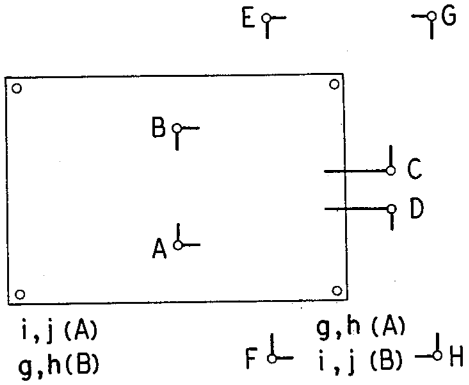
FIG. 2G shows the network section of FIG. 2A in relationship to array 21 under eight different conditions of link busyness.

Table I above shows that there are three nodes involved for each of the conditions A through H. The first or "key" node is the one to which the actual connection path has progressed in network 21 starting from the calling NCC. Each key node may access either of two nodes, respectively designated II and III. Either node II or node III, may be used in extending the connection provided an access link thereto is idle. The selection of either node II or III for conditions A and B will extend a minimum length path in the direction of the called node. Conditions C through H describe the circumstances where either or both of the X, Y coordinates of the key node have been forced out of the "rectangle" embraced between the *i,j* and *g,h* coordinates of the original calling and called nodes. The right-hand columns of Table I show the link at the new node, which can be accessed from the key node and the links outgoing from the new node II or III to extend a minimum length path in the direction of the called node. In the column labeled "Regress Link" are listed the links at nodes II and III to be used if the out links for extending a minimum length path are not available. A drawing showing the X,Y coordinates for each of conditions A through H is shown in FIG. 2G. The corners of the rectangle of FIG. 2G are the possible *i,j* and *g,h* coordinates of the calling and called nodes, respectively, for cases (A) and (B) and the points labeled A through H are positioned at the X,Y coordinates of the "key" node to which the connection has thus far been established.

DETAILED DESCRIPTION

Figure 13:
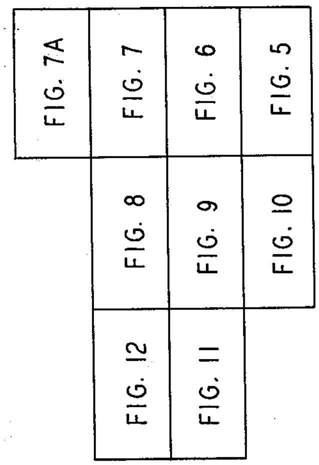
FIG. 13 shows how

FIGS. 5 through 12 should be arranged as shown in FIG. 13 throughout the remainder of the discussion of the detailed operations.

The network control process begins with the loading of input registers *i, j, g,* and *h* in the input register section 500 of FIG. 5. Registers *i, j, g* and *h* receive the Cartesian coordinate addresses of the calling node at coordinates *i, j* and of the called node at coordinates *g, h* from the call information processing system FIG. 2. Subtractors 51X and 52Y FIG. 5 compute the absolute differences $i - g$ or $g - i$ and $j - h$ or $h - j$, respectively. The results are entered into the XS counter 600 and the YS counter 601, FIG. 6, either as calculated through gates 546 and 542 or less (M/2) and (N/2) respectively by passing through subtractors 53X and 54Y and gates 545 and 543 and gates 632 and 633. Gates 632 and 633 are enabled from counters 600 and 601 respectively when they are reset or set to the count of zero.

The contents of XS counter 600, that is $i - g$, is applied to the left-hand input of summing circuit Σ602 and the contents of the *i* or *g* register is applied to the right-hand input of summing circuit Σ602. Whether *i* or *g* is entered depends upon whether gate 549 or 547 is enabled. For orientations 1 and 2 *i* is gated since subtractor 53X finds that in subtracting $|i-g|$ from (M/2) the difference is negative. If the difference is positive then the orientation is 3 or 4 and *g* is gated to summing circuit Σ602. The L + 1 counter also provides an input to the summing circuit Σ602. The scanner address field of scan leads from the NCCs is (L+1)X wide by X, since there are L + 1 sleeve leads at each NCC address. The quantity $L + 1 + i + \Delta X$ or $L + 1 + g + \Delta X$ which thus appears at the output of summming circuit Σ602 is entered into the X coordinate access switch 603 of sleeve lead scanner 604.

The contents of YS counter 601, that is *j–h*, is applied to an input of +Σ summing gate 606, and to an input of the −Σ summing gate 607. The contents of either register *j* or *h* reaches the right side of the summing circuits Σ606 and 607 depending upon whether the orientation is 1 or 2

$$\left(\leq \frac{N}{2}\right)$$

or 3 or 4

$$\left(> \frac{N}{2}\right).$$

The selection of summing circuit Σ606 or 607 depending upon whether or not the orientation is 1 or 4 or 2 or 3. Gates 531 to 536 receive ≤ or > inputs from the difference circuits 53X and 54Y to determine the orientation to be used. Gates 537 and 538 provide the *h* or *j* input to the summing gates Σ606 and Σ607.

The difference in the X coordinates of the calling and called nodes in subtractor 51X will enable the top input of OR gate 540 while if there is a difference in the Y coordinates of the calling and called node, the botton input of OR gate 540 will be enabled. In either event OR gate 540 will enable the right-hand input of AND gate 610, FIG. 6. A clock 1 pulse source is connected to the left-hand input of AND gate 610 and so long as either of the subtractors 51X and 52Y detect a difference in the aforementioned coordinates, the L + 1 counter 612 will be incremented on each clock pulse. Since the switching network of FIG. 2 was assumed to be an equi-interconnectable array of NCCs each of which was equipped with four links, L, in the illustrative embodiment, is equal to 4. When counter 612 reaches the count of L + 1,5 in this case, its left-hand output energizes an input of each of AND gates 613 and 614 and, assuming that flip-flop 616 is normally in the reset state, gate 614 will be enabled when the count of L+1 is reached.

The scanner 604 is addressed through coordinate access switches 603 for X and 609 for Y. There is an address for each sleeve lead as shown on FIG. 4 (or FIG. 7A). This is included in the X address by the input from counter L + 1 612 to the summing circuit Σ602. As the clock 1 pulses through gate 610 increment the L + 1 counter 612 steps from 0 to 4 and increments the X address of the scanner.

YS counter 601 which has been loaded with the difference of the Y coordinates of the calling and called nodes and directs Y coordinate access switch 609.

The scanner 604 output R will be energized if the sleeve lead being examined is grounded indicating a busy condition. The clock pulses entering the L + 1 counter 612 also control AND gate 630. These pulses are delayed by delay 631 so that the scanner output lead R is strobed once for each sleeve lead examined at the NCC. Each pulse applied to lead R increments counter 660 of scan counter map 640.

The contents of counter 660, more accurately, the half-count of the contents thereof, is entered into the one of scan counter memory cell 661 of scan counter map 640 which corresponds to the NCC whose 5 sleeve leads have just been scanned by scanner 604.

The half-count is obtained by neglecting to transfer to cells 661 the contents of the least significant stage of counter 660. Since it is assumed that these are binary (2 state) cells omitting the contents of this one stage will result in halving the count of the "busyness" of the links of the first NCC. Scan counter map 640 is addressed by counters 600 and 601 in step with the addressing of sleeve lead scanner 604 via AND gates 664 and 668, flip-flop Al being in the reset state. On the termination of the fifth clock pulse L + 1 counter 612 energizes its left-hand output enabling AND gate 614 to apply a pulse to the decrement input at the right-hand side of YS counter 601.

YS counter 601 now contains the quantity $h - j - 1$ and, accordingly, Y coordinate access switch addresses the NCC at coordinates $i + \Delta X, j + \Delta Y - 1$ ( i.e., at $h - 1$). During the next five clock pulses, the count of the busy ones of the five sleeve leads of the NCC at coordinates $i + \Delta X, j + \Delta Y - 1$ is applied over lead R to counter 660. This continues until counter 601 is decremented to zero. As each NCC of the column is scanned the cumulative half-count of the "busyness" of each preceding NCC of the column is entered in the corresponding one of scan counter memory cells 661 via the right-hand input of summing gate Σ655. (The left-hand input of gate Σ655 is zero at this time.)

When counter 601 is decremented to zero, indicating that a column of NCCs has been scanned, the left-hand output of counter 601 is momentarily energized. This signal is coupled through AND gate 620 and OR gate 621 to reset counter 660 to prepare it to receive the busyness counts for the next column of NCCs to be scanned. The energization of the left-hand output of counter 601 also applies a decrement signal through OR gate 618 to XS counter 600 decrementing the count therein by 1. Accordingly, the contents of counter 600 is now $g - i - 1$. YS counter 601, after decrementing XS counter 600, is immediately reloaded by subtractor 52Y to the full count of $h - j$ through gate 633.

With these counts in counters 600 and 601, scanner 604 now addresses the first NCC in the next column, i.e., the NCC at coordinates $i + \Delta X - 1, j + \Delta Y$. During the next five clock pulses the count of busy sleeve leads at this NCC is entered into counter 660 and on the fifth clock pulse counter 601 is decremented.

When counter 601 has again been decremented to zero, indicating completion of scanning of the second column, its left-hand output again decrements counter 600 by one and the sleeve lead scanner is then directed to scan the column of NCCs whose abcissa is $i + \Delta X - 2$. Scanning of columns from the column of the called node toward the column of the calling node thus continues until XS counter 600 has finally been decremented to zero corresponding to the completion of scanning of the column whose abcissa is equal to that of the calling node. At this time the left-hand output of counter 600 becomes energized setting flip-flop 616.

The setting of flip-flop 616 disables AND gate 614 and enables AND gate 613 thereby transferring the subsequent pulses from counter 612 from counter 601 to counter 600. Counters 600 and 601 are reloaded through gates 632 and 633 by subtractors 51X and 52Y and the X and Y coordinate access switches 603 and 609 are again directed to the NCC at coordinates $i + \Delta X, j + \Delta Y$. However, this time X coordinate counter 600 will be decremented on each fifth clock pulse so that the rows of NCCs between the row of the called node and the row of the calling node will be scanned by counter 604.

As each of the NCCs of the rows between the columns of the called and calling nodes are now scanned, the count of busy links at each node is entered into counter 660. The half-counts of the contents of counter 660 are directed to the appropriate cells 661 of map 640 and are added via output lead R, gate 671 and summing gate Σ655 to the previous "busyness" counts that were accrued in cells 661 during column scanning.

AL flip-flop 667 remains reset until YS counter 601 has been counted down to 0 with scanner flip-flop 616 set. At this time, the scanning of columns and rows has been completed and AL flip-flop 667 is set. At the completion of scanning the memory cells 661 contain a cumulative half-count of the busyness of the links of that portion of the network bounded by the coordinates of the calling and called NCCs. Accordingly, there has been configured in scan counter map 640 a relative address "scratch pad" memory map of the busyness of the relevant portion of network 21 through which a communications path must be established.

Figure 9:
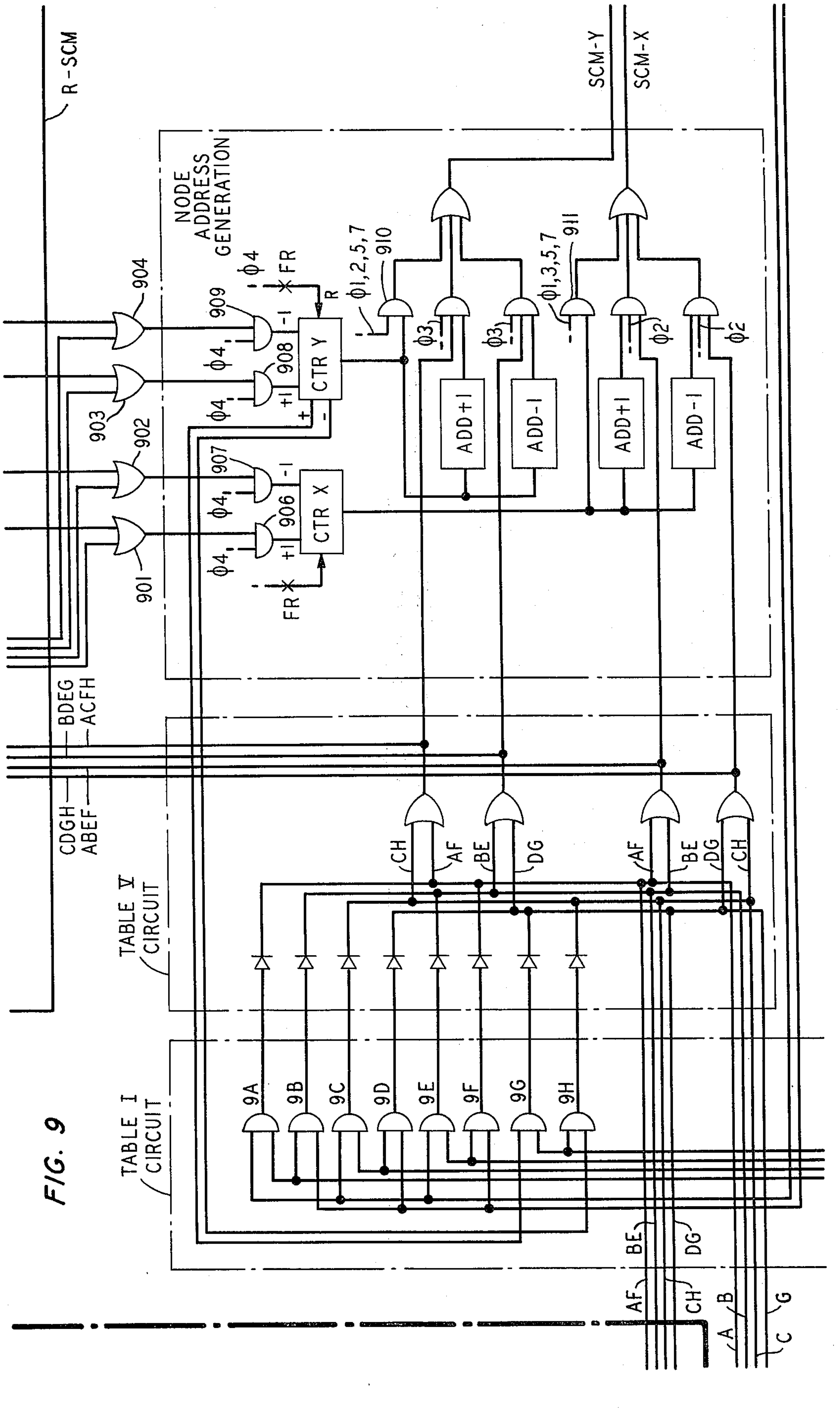
FIG. 9 shows the node address generating circuitry for controlling the scan counter map of FIG. 6 and the signal distributor of FIG. 5.

The setting of AL flip-flop 667 disables gates 664 and 668 and enables gates 666 and 670 and thereby transfers the accessing of scan counter map 640 from counters 600 and 601 to that of the node address generation circuit of FIG. 9 and leads SCM-X and SCM-Y. When leads SCM-X and SCM-Y are energized, the stored accumulated contents in the accessed ones of memory cells 661 are read out over lead R and AND gate 672 to lead R-SCM.

The set output of AL flip-flop 667 via AND gate 521, FIG. 5, sets flip-flop 522 of control state sequence generator 525 whose output stages $\phi 2$ through $\phi 6$ are connected to corresponding designated points in FIGS. 8 through 11. The first clock 2 pulse actuates stage $\phi 1$ of sequence generator 525.

PREPARING TO OPERATE THE FIRST CROSSPOINT

With state $\phi 1$ activated, gates 910, 911 associated with leads SCM-X and SCM-Y of the node address generating circuit, FIG. 9, are enabled. The enabling of gates 910 and 911 places addresses relative to the calling node I on leads SCM-X and SCM-Y. Absolute addresses are furnished to signal distributor 526 via summing gates Σ527 and Σ528, respectively, which employ the contents of the *i* or *g* (Case B) and *j* or *h* (Case B) registers through gates 547, 548 and 549 together with the relative address information on leads SCM-X and SCM-Y.

Figure 7A:
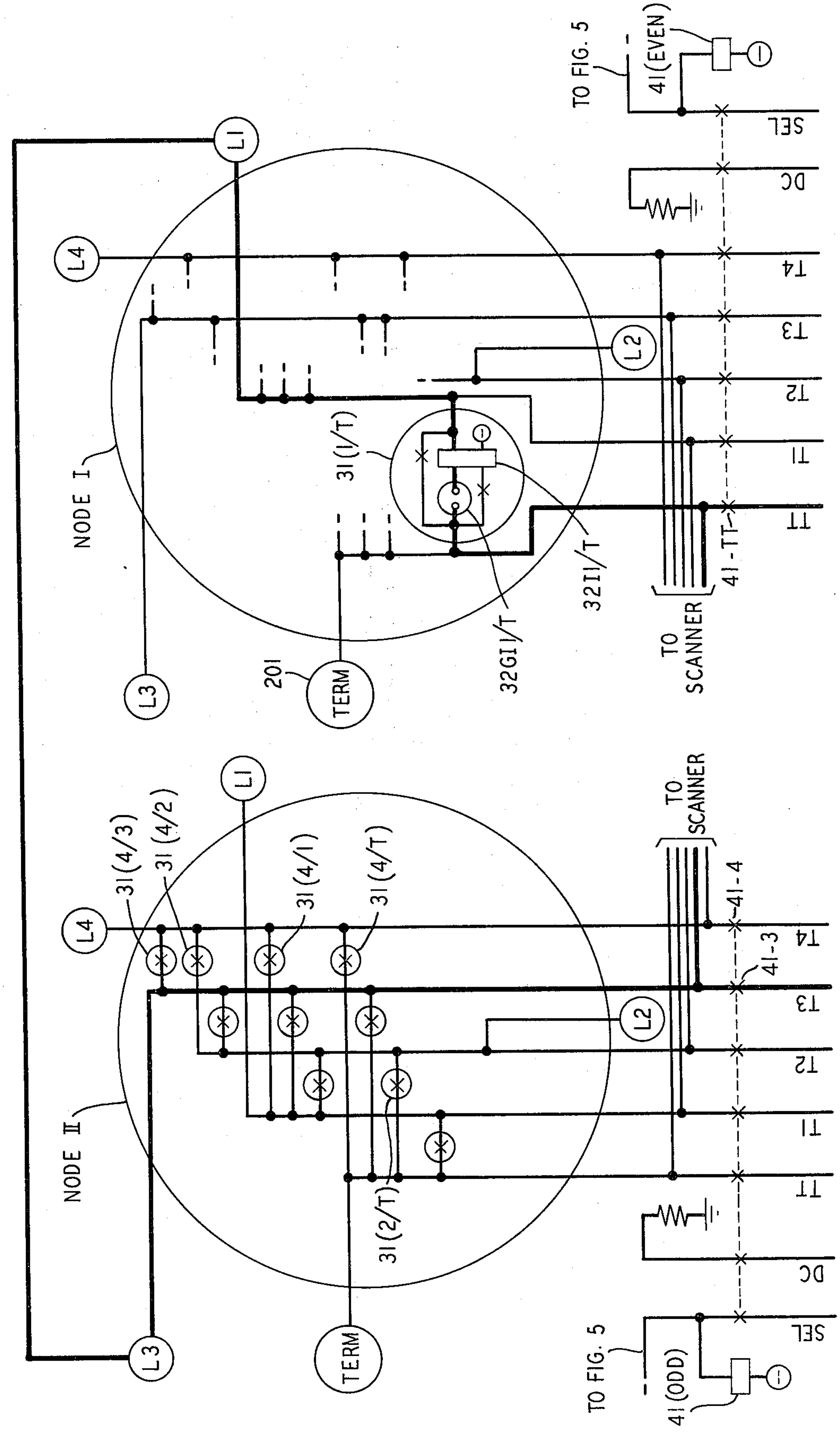
FIG. 7A shows the marking of the calling node and the first selected node.
Figure 8:
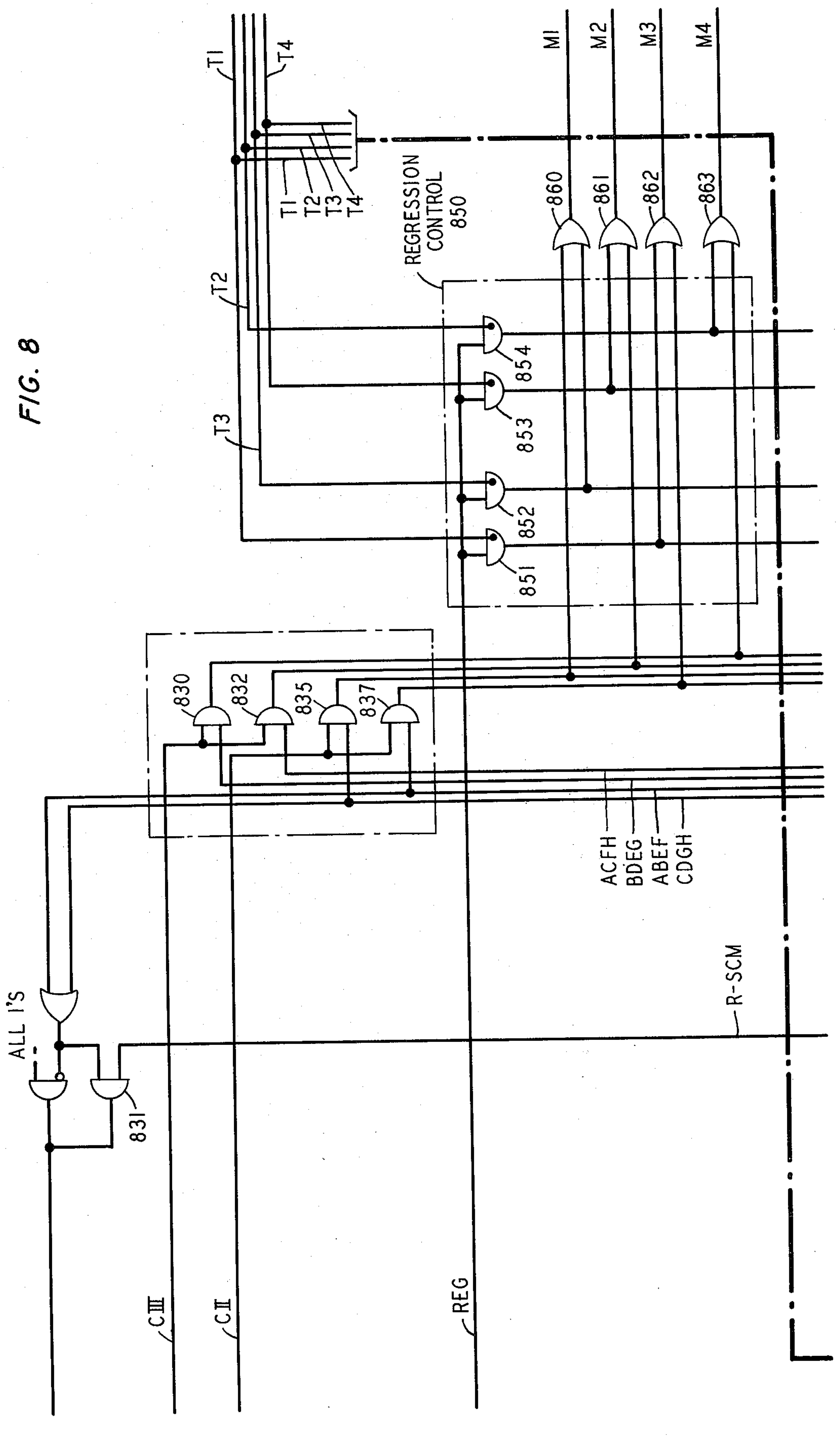
FIG. 8 shows some of the logic circuitry for controlling the application of the marking potentials by the circuitry of FIG. 7.

At the beginning of $\phi 1$ the information on leads SCM-X and SCM-Y is O,O. Signal distributor 526 responds to the address information in registers *i* and *j* and grounds lead SEL to the connector relay 41 for the calling node (called for case B) at coordinates *i,j*. Let it be assumed that the calling node is even-numbered node I, FIG. 7A. The node connecting relay 41 (even) operates closing make contacts 41-TT, 41-T1 through 41-T4, 41-DC and 41-SE. With node connecting relay 41 (even) operated, resistance ground in FIG. 7A is applied to lead DC over contact 41-DC operating relay DCE in FIG. 7. Had calling node I been odd-numbered (see FIG. 2) relays 41 (odd), FIG. 7A, and DCO, FIG. 7, would have been operated. Flip-flop 701 is set by the operation of contact DCE-1 thereby operating relay RMP and enabling gate 711. Relay MTE is operated by gate 711 and locks over contacts DCE-2.

A heavy positive potential H+, illustratively +75 volts, is applied to the sleeve lead of the calling node's termination circuit over the path, FIG. 7, from H+; contacts FR-1 (normal); RMP-2 (operated) 7R (normal); contact MTE; sleeve lead TT and contact 41-TT. This H+ potential will be available later to break down one of the gas tubes such as gas tube 32GI1/T of one of the four crosspoints of calling node I that connect the termination circuit 201 with the one of the four links outgoing to node II or node III (not shown).

The operated MTE relay FIG. 7 in operating also operates relay AME permitting relay AMER to operate. The calling node connecting relay 41 (even), locks operated to ground on lead SEL via contacts 41-SE (FIG. 7A) and DCE-4, AMER-4, and AME-4, FIG. 7.

CHOOSING THE FIRST NODE

Figure 10:
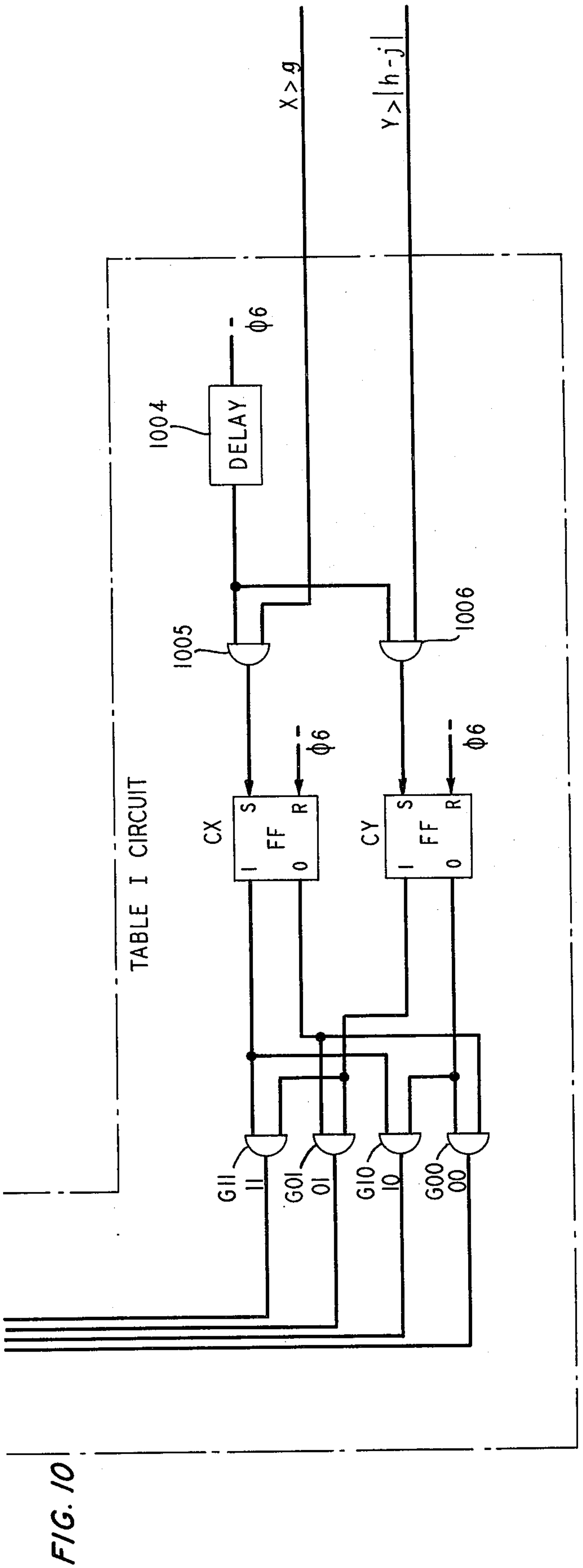
FIG. 10 shows the circuitry for controlling the address generation circuit of FIG. 9.

At the end of the first clock 2 pulse control state counter CRT-S, of the sequence generator 525 energizes CRT-$S_2$ state $\phi 2$. Assuming that flip-flops CX and CY, FIG. 10, are both in the rest state, gate GOO will be activated enabling gates 9A or 9B in FIG. 9 depending upon whether case A or case B orientation is detected by the comparator circuits of FIG. 5. The outputs of gates 9A through 9H correspond to the conditions A through H of Table I, supra. Accordingly, these gates of FIG. 9 have been labeled "Table I Circuit" in the drawing.

In Table I, supra, it was stated that node II, one of the next nodes that may be accessed from the calling node I, lies at coordinates X + 1,Y, where X and Y are now i and *j*, respectively. Signal distributor 526 is accordingly directed during $\phi 2$ to the NCC at the coordinates $i + 1,j$ by the output of gate 9A and distributor 526 operates the node connecting relay 41 (odd) of this node II.

Operation of the node connecting relay 41 (odd) of node II extends the four sleeve leads T1-T4 of links L1-14 of this node to the top of FIG. 7. The continuity of sleeve leads T1–T4 is extended over the back contacts of relay AMO to the Table II Circuit of FIG. 11 where the busy/idle potentials on these leads is examined. Referring now to Table II, it should be noted that the path from node I to node II under Table II conditions A or B must employ link L3 of node II. Accordingly, if node II's link L3 is busy indicating that node II cannot be selected, the ground potential on lead T3 is detected during state $\phi 2$ by Table II circuit gate 1102 which is primed for conditions A or B by gate 1101. Gate 1102, bia OR gate 1103, sets the access-to-node-II-busy-flip-flop AIIB of FIG. 12.

Figure 11:
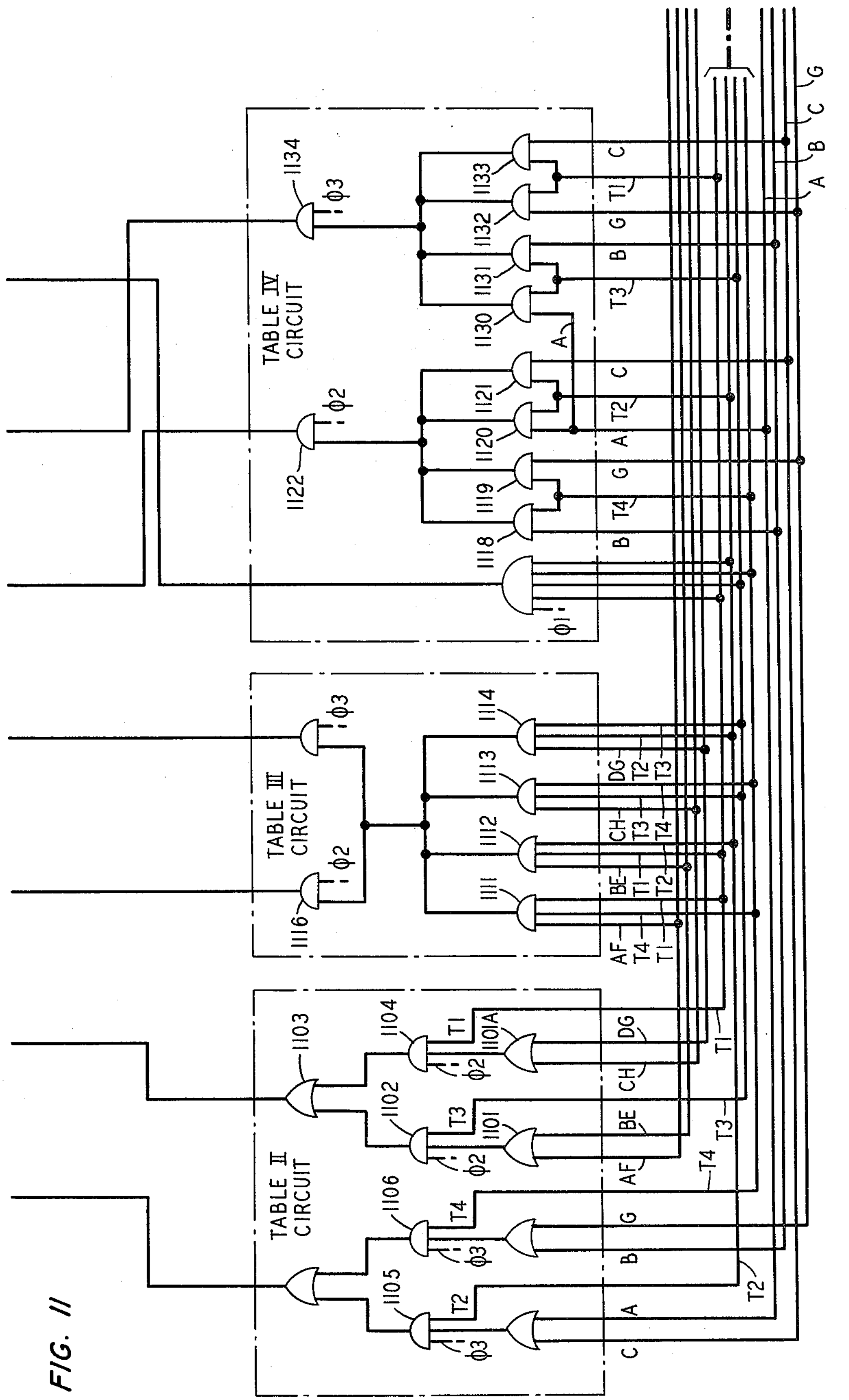
FIG. 11 shows the access link testing circuitry.

TABLE II (See FIG. 11)

| ACCESS LINKS (See FIG. 4A) CONDITIONS (See Table I) | A,F | B,E | C,H | D,G |
|---|---|---|---|---|
| Node II | L3 | L3 | L1 | L1 |
| Node III | L2 | L4 | L2 | L4 |

Figure 12:
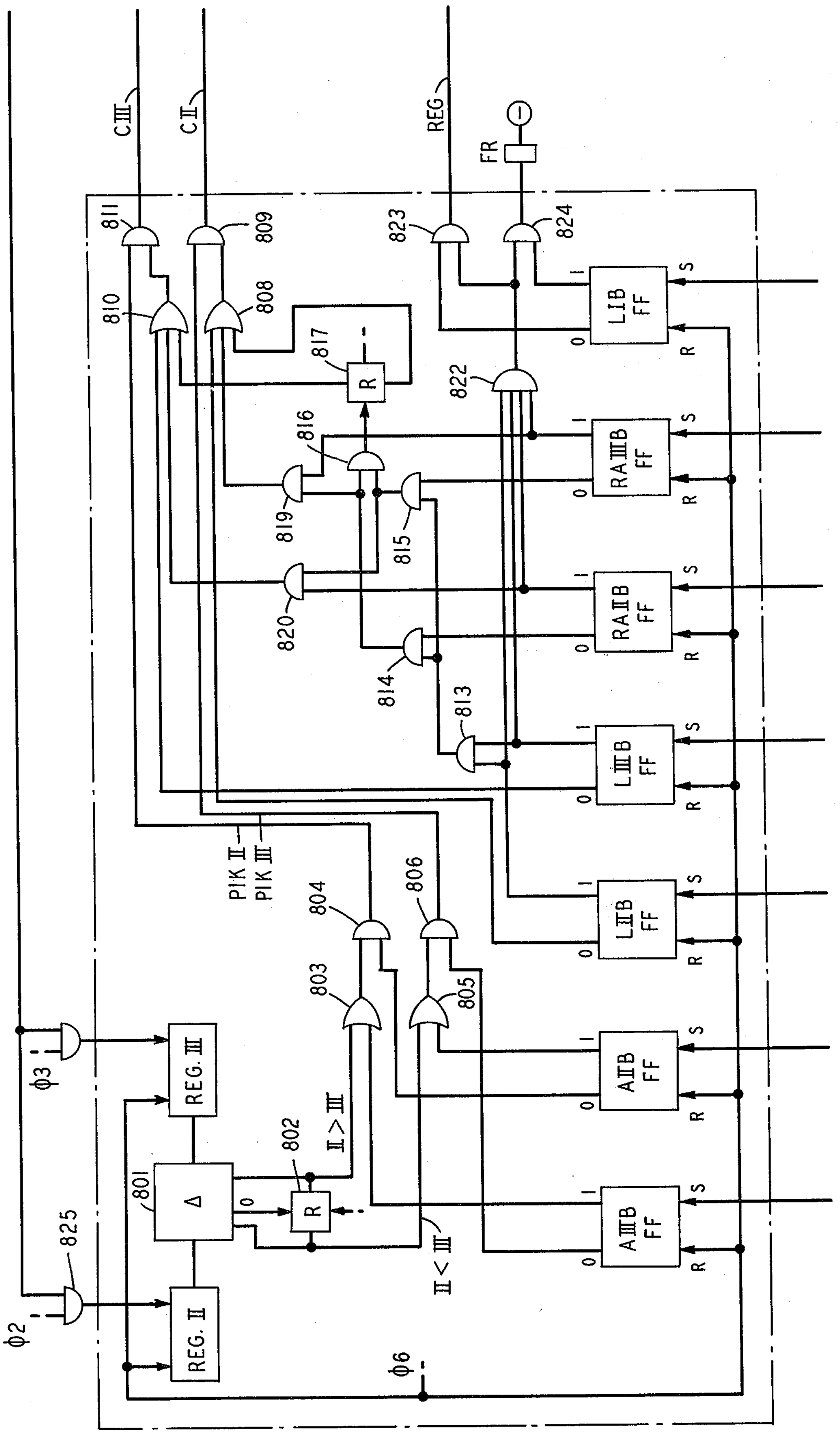
FIG. 12 shows the decision logic which responds to the circuitry of FIG. 11 and controls the circuitry of FIG. 8.

If instead of conditions A or B which have just been described, conditions F or E were detected by the Table I circuitry of FIGS. 9 and 10 (see also Table I, supra), gates 1101 and 1102 would likewise have been enabled to set flip-flop AIIB of FIG. 12 since these conditions also require the use of node II's access link L3.

If the Table I circuitry of FIGS. 9 and 10 had detected conditions C, H, D, or G gates 1101A and 1104 of FIG. 11 would also have set flip-flop AIIB in FIG. 12.

TABLE IIII (See FIG. 11)

| OUT LINKS (See FIG. 4A) CONDITIONS (See Table I) | A,F | B,E | C,H | D,G |
|---|---|---|---|---|
| Nodes II & III | L1,L4 | L1,L2 | L3,L4 | L2,L3 |

At the same time that Table II circuitry of FIG. 11 is examining the accessibility of links to node II, the Table III circuitry of FIG. 11 tests whether node II will have any available outlinks in the most direct path toward the ultimate or called node. Under conditions A and F, gate 1111 tests the busy/idle states of node II leads T1 and T4; gate 1112 tests the busy/idle states of leads T1 and T2 under conditions B and E; gate 1113 tests the busy/idle states of leads T3 and T4 under conditions C and H and gate 1114 tests the busy/idle states of leads T2 and T3 under conditions D and G. Accordingly, under condition A which has priorly been assumed to be the present circumstance, gate 1111 will activate gate 1116 during state $\phi 2$ if node II has both of its available outlinks L4 and L1 busy. Gate 1116 then sets outlink-of-node-II-busy-flip-flop LIIB in FIG. 12.

While the Table II and Table III circuits are respectively examining the accessibility of links to node II and the availability of outlinks from node II in the direction of the called node, the Table IV circuitry of FIG. 11 examines the availability of those of node II's links which do not lie in the most direct path toward the ultimate called node, i.e., the Table IV circuitry examines node II's "regress" links. Thus, depending upon which of conditions A through H is detected by the Table I circuitry of FIG. 9, and upon which of node II's regress links L2 or L4 are busy, gates 1118, 1119, 1120, or 1121 will be enabled. For example, if during condition A regress link L4 was busy as indicated by the presence of a ground signal on lead T4, gate 1118 will be enabled and in turn would enable gate 1122 during state $\phi 2$.

TABLE IV (See FIG. 11)

| | REGRESS LINKS (See FIG. 4A) CONDITION (See Table I) | | | | | | | |
|---|---|---|---|---|---|---|---|---|
| | A | B | C | D | E | F | G | H |
| Node II | L2 | L4 | L2 | L4 | L4 | L2 | L4 | L2 |
| Node III | L3 | L3 | L1 | L1 | L3 | L3 | L1 | L1 |

TABLE V (See FIG. 9)

| Remains | NODE CHOICE Conditions | Changes |
|---|---|---|
| CII Y | A, B, E, F | X+1 |
| | C, D, G, H | X−1 |
| CIII X | A, C, F, H | Y+1 |
| | B, D, E, G | Y−1 |

During state $\phi 3$ Table II circuit gates 1105 and 1106 test node III's access links L2 and L4 by examining the busy/idle potentials on node III's sleeve leads T2 and T4. If node III cannot be accessed during state $\phi 2$, access-to-node-III-busy-flip-flop AIIIB in FIG. 12 would be set.

At the same time that signal distributor 526 accesses node II so that the Table II, III and IV circuitry can test node II's sleeve leads, scan counter map 640 accesses the one of memory cells 661 for node II and the count accruing in that cell is entered via gate 672 and leads R-SCM into register REGII, FIG. 12 through gate 831 and gate 825. Gate 831 is enabled by the presence of any condition A through H.

Process control state sequence 525 now advances to control state $\phi 3$.

During state $\phi 3$ the sleeve leads of node III are tested. As indicated in Table I, supra, node III lies at coordinates X, Y $\pm$ 1 or, in the instant case, at the coordinates $i, j+1$ where $i, j$ are the coordinates of the calling node. The information on leads SCM-X and SCM-Y during $\phi 3$ is accordingly 0,$\pm$ 1 depending, again on which of conditions A-H were detected by gates 9A–9H of the Table I circuitry of FIG. 9. These gates control node address generation circuit 900. The information on leads SCM-X and SCM-Y is added to the contents of the $i+j$ registers of FIG. 5 in summing circuits 527 and 528 and provide the absolute address of node III to signal distributor 526. The node III relative address information on leads SCM-X and SCM-Y is simultaneously provided to scan counter map 640.

When signal distributor 526 accesses node connecting relay 41 (odd) for node III, the connecting relay for node II is released. The connecting relay for node II is released since none of relays MT0 or M10 to M40 was yet operated in FIG. 7 and therefore no holding ground was applied to lead SEL over contacts DCO-4, AMOR-4 and AMO-4. Relay 41 (even) for calling node I remains operated since relay MTE was operated, locked to contact DCE-2 and maintained lead SEL (even) grounded over contacts DCE-4, AMER-4 and AME-4.

It should be noted that in network 21 nodes II and III are always on the same diagonal but are on a different diagonal than node I.

The operation of the node connecting relay 41 (odd) for node III brings down into the top of FIG. 7 the sleeve leads T1–T4 of the four links of node III. The busy/idle potential appearing on the sleeve leads is evaluated by the state $\phi 3$ actuated Table II, III and IV of FIG. 11 and flip-flops AIIIB, LIIIB or RAIIIB in FIG. 12 are set or not depending, respectively, upon whether access to, outlinks from or regress links of node III are busy. During state $\phi 3$ register REGIII receives the count accruing in the one of scan counter memory cells 661 corresponding to node III. Process control state sequence generator 524 counter CTR-$S_{2-5}$ now advances to state $\phi 4$.

The contents of registers REGII and REGIII are now compared in comparator 801 to see which is larger. A bigger count indicates a busier node. If node III is less busy, gate 804 is enabled. If node II is less busy, gate 806 is enabled. If the outputs are equal (difference is 0), random selection cicuit 802 operates and activates either gate 804 or 806 at random. If both of the access links of a node are busy, as indicated by the setting of flip-flop AIIB or AIIIB, the output signal of the set one of these flip-flops will pass through gate 803 or 805, respectively, and will enable gate 804 or 806 whose other inputs are provided with the 0 outputs of flip-flops AIIIB and AIIB, respectively. If both outlinks of a node are busy, as indicated by the setting of flip-flops LIIB or LIIIB, the other node will be selected by the remaining circuitry of FIG. 12. Assume that flip-flop LIIB is not set. Its 0 output will, via gate 808, enable gate 809 to energize the choose node II output lead CII. If flip-flop LIIIB is not set, its 0 output will, via gate 810, enable gate 811 to energize the choose node III lead CIII.

If both nodes II and III have both of their output links busy, both flip-flops LIIB and LIIIB will be set thereby enabling gate 813. If either node II or node III has an idle regress link, the 0 outputs of flip-flops RAIIB or RAIIIB will enable gate 814 or 815, respectively. If both nodes have an idle regress link, gates 814 and 815 will enable gate 816 to trigger random generator circuit 817 whose outputs will select either gate 809 or 811 at random. If only node II has an idle regress link available under these circumstances only gate 814 will be enabled which, via gates 819 and 808, will enable 809 and lead CII. Similarly, if only node III had an idle regress link available, gates 815 and 820 would be enabled and in turn would, via gate 810, enable the choose node III gate 811.

If the outlinks of nodes II and III are all busy, the upper two inputs of AND gate 822 will be enabled. If all the regress links of both nodes II and III are also busy, AND gate 822 will be fully enabled. Assuming that flip-flop LIB is reset, AND gate 823 will energize lead REG to regression control circuit 850, FIG. 8. If the outlinks of nodes II and III are all busy and neither node II or node III has an idle regress link available, and if flip-flop LIB was set during state $\phi 1$ because node I had all of its sleeves busy, gate 824 is operated and it, in tuen operates forced release relay FR. Operation of forced release relay FR forces the release of the connection, to whatever stage it has progressed. Work contacts of this relay (not shown) signal the call information processing system, FIG. 2, to "reorder," that is, to attempt the establishment of another path from the calling node to the terminating node.

Assuming however that node II can be selected, lead CII is energized by gate 809. The count accruing in counter CTR-X, FIG. 9, is incremented by one over the path including lead CII and gate 837, FIG. 8, gates 901 and 906, FIG. 9. The count in counter CTR-Y remains unchanged. Accordingly, the next node in the connection from the originating key node will be at coordinates X+1,Y.

Process control state sequence generator 525 now advances the counter CTR-$S_{2-5}$ to state $\phi$5. The energization of lead CII and gate 837, FIG. 8 enables OR gate 862 to energize lead M3. During phase $\phi$5, gate 704, FIG. 7 is enabled. The contents of counters CTR-X and CTR-Y in FIG. 9 are delivered through gates 911 and 910 to leads SCM-X and SCM-Y, respectively. Signal distributor 526, FIG. 5, utilizing the information on leads SCM-X and SCM-Y access the new key node by operating its node connecting relay 41 odd FIG. 7A. Operation of the node connecting relay for the new key node extends the SEL, DC, TT and T1–T4 leads into the top of FIG. 7. Relay DCO will be operated since the new key node is on an odd-numbered diagonal.

It will be recalled that during phase $\phi$1, since it was assumed that the calling node was on an even-number diagonal, flip-flop 701 was set by relay DCE, incident to the operation of the node connecting relay 41 (even) for calling node I. During phase $\phi$1, the 1 output of flip-flop 701 operated relay MTE via gate 711 and relay MTE remained locked to ground over contact DCE-2. Relay MTE operated also operated relay AME and contacts DCE-4, AMER-4 and AME-4 maintained a holding ground on lead SEL (even) to node connecting relay 41 (even) for node I. With the node connecting relay for node I operated, contacts of relay MTE continue to apply the heavy positive potential H+ to the sleeve lead TT of node I.

During phase $\phi$5, node II was assumed to have been selected since node I was assumed to be an even-numbered diagonal. At the beginning of phase $\phi$5 flip-flop 701, remaining in the set state enables gate 706 thereby operating relay MO. Relay MO operated connects the outputs of phase $\phi$5 AND gates 702, 703, 704 and 705 to windings of relays M10, M20, M30 and M40, respectively. Assuming that node II is selected, lead M3 and gate 704 are enabled to operate relay M30. Relay M30 operated connects odd diagonal node sleeve lead T3 over make contact 3 of relay RMP and the winding of relay CK to the heavy negative potential H−.

FIG. 7A may now be referred to for the purpose of tracing the H+ potential applied to the sleeve TT of the even-numbered terminating node I and the H− potential applied to the sleeve T3 of the odd-numbered next node II. In FIG. 7A the originating node I has been drawn to the right of the first-selected node II to facilitate the tracing of leads from FIG. 7. It should be understood that in the actual network node II would be physically located to the right of node I. In node I of FIG. 7A only the crosspoint 31(1/T) has been shown in detail and in this crosspoint only the sleeve lead circuitry is depicted. This crosspoint when operated connects the terminating circuit to node I's link L1. In node II of FIG. 7A each of the ten crosspoints for establishing connections among that node's terminating circuit or links is shown by means of a single line drawing, omitting the tip and ring leads, crosspoint relays and gas tubes. The heavy negative potential H− is applied in FIG. 7 over a back contact and the winding of relay CK, operated make contact 3 of relay RMP, an operated make contact of relay M30 to sleeve lead T3, contact 41-3 of FIG. 7A node connecting relay 41 (odd), link sleeve lead L3, of node II to link L1 of node I, the upper winding of node I's crosspoint relay 32I1/T and the right-hand electrode of gas tube 32GI1/T. The left-hand electrode of node I's gas tube 32GI1/T is connected to node I's terminating circuit sleeve conductor TT to which a heavy positive potential H+ was applied over the previously traced path established during phase $\phi$b 1. That path, originated in FIG. 7 and included H+, make contact 2 of relay RMP, back contact 7R, and make contacts MTE and 41-3 of node connecting relay 41 (even). The gas tube 32GI1/T of node I which connects the calling node's terminating circuit to node I's outgoing link L1 (and node II's incoming link L3) breaks down under the combined sum of the H+ and H− potentials. Crosspoint relay 32I1/T operates and locks to the resistance ground provided by calling node's terminating circuit 201 (se FIG. 4B) or to the heavy positive potential applied to node I's lead TT. Relay CK (FIG. 7) operates and removes the H− potential from lead T3 of node II and replaces it with resistance H+ potential.

When relay M30 operated incident to the marking of the sleeve lead T3 of node II's link L3, one of its make contacts at the left-hand side of FIG. 7 operated relay AMO. When relay AMO operated back contact AMO-1 at the right-hand side of FIG. 7 opened the operating path of slow release relay AMER which was operated during phase $\phi$1. Relay AMER is slow enough in releasing to permit the crosspoint and CK relays to operate. With the release of relay AMER, holding ground is removed from the SEL lead holding the calling node's node connecting relay 41 (even), FIG. 7A, which releases, in turn releasing relay DCE. The release of relay DCE at its back contact DCE-3 completes an operating path to the reset lead of flip-flop 701 which path was prepared when node II was selected and contact DCO-3 operated. The resetting of flip-flop 701 releases relay RMP which prepares the circuit for operating the next crosspoint with potentials that will be reversed from those applied in operating the crosspoint at node I. The contacts of relays RMP in the upper central portion of FIG. 7 are of the bridging type to insure that the H+ potential remains at either side of the link to hold the crosspoint. Relay DCE released at its contact DCE-2 releases relay MTE which releases relay AME.

In the foregoing example, it was assumed that the calling node I was located on an even numbered diagonal and that the H+ potential was applied over an operated contact of relays RMP and MTE to the crosspoint sleeve controlling lead TT. It was also shown that since the next node II or III would have to lie on an odd numbered diagonal that the marking potential H− was applied through the winding of relay CK and the other operated make contact of relay RMP and contact M30 to lead T3 of node II. The combination of these opposite polarity marking potentials broke down the gas tube of the calling node which connects the sleeve of the calling node's terminating circuit to link L1 outgoing from node I and link L3 incoming to node II.

If the calling node I had instead been located on an odd numbered diagonal, flip-flop 701 would have been reset during phase $\phi 1$ and relay RMP would be released. The H+ potential would have been applied over one back contact of relay RMP and make contact of relay MTO to the TT lead of the calling node I. Likewise the next node II or III would have to be located on an even numbered diagonal and, accordingly, the H− marking potential would be applied over the other back contact of relay RMP and an operated M-E contact associated with the sleeve lead of the link by means of which node II or III would be accessed by node I.

Accordingly, it is seen that the first node from which a connection is being extended is marked with an H+ potential and that the node to which the connection is being extended is marked with an H− potential. After the crosspoint is operated at the first node, the CK relay operates and removes the H− marking potential from the second mode. The second node then becomes the new key node and the process is repeated as if it were a first node I looking for a subsequent noe II or III.

When the node connecting relay for node I releases, the operating path for relay CK is interrupted and relay CK releases. The restored back contact CK-5 of relay CK in FIG. 5 now permits the process control state sequence generator 525 to advance, generally to phase $\phi 6$ (only when signal distributor 526 reaches the address of the terminal called node, does sequence generator 525 advance to phase $\phi 7$). During phase $\phi 6$, the flip-flops and registers II and III of FIGS. 12 and 10 are reset. Afte a short delay whose duration is determined by delay circuit 1004, flip-flops CX and CY in FIG. 10 are reoperated via gates 1005 and 1006.

As the process control state sequence generator 525 cycles through phases $\phi 2$ through $\phi 6$, the link testing, scan-counter comparisons and link selections take place progressively, thereby advancing the connection through the nodal network.

When phase $\phi 5$ is again reached after a new node II or III selection a new M-O or M-E relay in FIG. 7 will be operated and the sequence repeated. The alternation of the marking potentials is accomplished by the alternate operation and release of relay RMP under control of flip-flop 701. On each selection of a next node, the operation of a crosspoint at the key node connects the key node to a link outgoing to the selected next node. Between selections of next nodes, the path through the nodal network is held up by the resistance ground applied to the sleeve lead from the calling node's terminating circuit and the H+ potential applied over the contacts of relay RMP. The operation of the circuitry extends the connection path through the nodal network on the basis of first selecting a minimal length path, and if this unavailable, a regressive path is resorted to. When that is unavailable a forced release is signaled,

CONNECTION TO TERMINATING NODE

In FIG. 5, AND gate 510 and matching circuits 511 and 512 determine when the terminating node has finally been selected. Gate groups 550 and 551 provide the address of the terminating node which may be the called or calling node depending upon when case A or B exists. At this point, AND gate 510 is energized and its output inhibits gate 513 thereby preventing flip-flop 514 from generating phase $\phi 6$. The output of AND gate 510 enables gate 515 when relay CK releases after the crosspoint at the last key node is operated to extend the path to a link accessing the terminating node. When gate 515 is enabled, flip-flop 517 is set operating relay 7R.

When the node connecting relay 41 for the called node is operated by signal distributor 526 on phase $\phi 5$, relay MTO or MTE in FIG. 7 is operated through Gate 712 or 711 depending upon whether the called node is on an odd or even numbered diagonal. The contacts of relay 7R, FIG. 4B, apply H− potential to the sleeve lead TT of the terminating terminal circuit operating the crosspoint to connect it with the marked access link. At this time, the H+ and H− marking potentials are applied over contacts of the same node connecting relay whereas in previous connections, the H+ and H− marking potentials are forwarded over contacts of the node connecting relays for adjacent nodes.

When the CK relay operates in series with the crosspoint relay, on OK signal (not shown), is sent to the call information processing system, FIG. 2, which returns a release signal to restore all the counters and flip-flops in the network control of FIGS. 5 through 12.

FORCED RELEASE

Should all links out of nodes II and III, including the regress links, be found busy, relay FR is operated in phase $\phi 4$. Relay FR in operating returns counters CTR-X and CTR-Y to normal (O,O).

In phase $\phi 5$ the original terminal marking relay MTO or MTE is reoperated. A negative 48 volts is applied to the sleeve reducing the potential across the locking windings of all crosspoints, and particularly to the first one, to zero, thereby causing its release and the release of all others operated to establish the partial connection being released.

A reorder signal is sent to the call information processing portion of the system, and after a timed interval it returns a release signal. In this way the partially established connection is forced to be released.

Accordingly, there has been described a nodal switching network in which a plurality of equiinterconnectable switching nodes are disposed along the surfaces of a re-entrant or convoluted switching plane and in which a switching path is established in a deterministic manner involving the ascertainment of the busyness of available links at possible intermediate nodes. Further and other modifications to the within described circuitry and methods will become apparent to those skilled in the art without departing from the spirit and scope of my invention.

What is claimed is:

1. A switching network for establishing interconnections amongst any of a plurality of termination circuits comprising a plurality of switching nodes, each of said nodes being associated with a respective one of said termination circuits, a plurality of links for equi-interconnectably linking any of said switching nodes, common control means for controlling the extension of a connection between a calling and called one of said nodes, said connection extension controlling means including means for finding an idle path among said plurality of links between said calling one and said called one of said nodes, means for ascertaining the number of busy links of each of the nodes located between the coordinates of said calling and called ones of said nodes, and means for extending said connection path amongst the least busy ones of said nodes.

2. A switching network according to claim 1 wherein said busy links ascertaining means includes a plurality of memory cells corresponding to the number of said nodes located between the coordinates of said calling and called ones of said nodes, and means for accumulating in said memory cells a count of the busy links of the nodes located in the rows and columns of said nodes between the coordinates of said calling and called ones of said nodes.

3. A switching network according to claim 2 wherein said connection controlling means includes means operable incident to the selection of the next node from a given node for determining the next node lying in the shortest direction path between said calling and called nodes.

4. A switching network according to claim 3 wherein said connection controlling means includes means for sequentially testing said next node for idle links lying in said shortest direction path between said calling and called nodes.

5. A switching network according to claim 4 wherein said connection controlling means includes means for extending said connection path to a tested one of said next nodes indicated as having the least number of busy links and having an idle link in said shortest direction path.

6. A switching network according to claim 5 wherein said connection controlling means includes means for nevertheless extending said connection path to a more busy one of said tested nodes which has an idle link available in said shortest direction path when said least busy node does not have an idle link lying in said shortest direction connection path.

7. A switching network according to claim 4 wherein said connection controlling means includes means operable incident to said testing of said nodes and incident to the selection of a next node from a given node for determining whether a tested next one of said nodes has a link accessible to said given one of said nodes.

8. A switching network according to claim 7 wherein said connection controlling means includes means for extending said connection path to a next one of said nodes having a link accessible to said given node and not lying in said shortest direction connection path when said least-busy node and said more-busy one of said tested nodes have no idle links available in said shortest direction path.

9. A switching network according to claim 1 wherein said means for finding an idle path among said links includes means for ascertaining the busyness of nodes adjoining a given one of said nodes to which said connection path has been extended and means for selecting a least busy one of said adjoining nodes lying in the shortest direction path between said calling and called ones of said nodes.

10. An arrangement according to claim 9 wherein said connection controlling means includes means for forcing release of said connection path when none of said adjoining nodes can be selected.

11. An arrangement according of claim 10 wherein said means for forcing said release of said connection path is operated from said calling one of said nodes after said connection has been extended to said given one of said nodes.

12. A switching network according to claim 7 wherein said connection controlling means further includes means for applying respective marking potentials at said given node and at said tested next one of said nodes having a link accessible to said given one of said nodes.

13. A switching network according to claim 12 wherein said means for applying said respective marking potentials to said given and to said tested next one of said nodes includes means for applying alternate polarity marking potentials to said nodes.

14. A marking circuit for controlling the extension of a switching path in a switching network having a plurality of switching nodes, each of said switching nodes having a crosspoint and a controlling conductor therefor, said crosspoint being operable to extend said switching path over a link to one of a plurality of further ones of said switching nodes, comprising means operable incident to the selection of a first one of said nodes for applying a particular polarity marking potential to the crosspoint controlling conductor thereof, means operable incident to the selection of one of said further ones of said nodes for applying an opposite polarity marking potential to the crosspoint control conductor thereof associated with a link to said first one of said nodes, means at said first one of said nodes connected between said first and said one of said further ones of said nodes controlling conductors for operating said first node crosspoint when said opposite polarity marking potential appears on said link, and means controlled by the operation of said first node crosspoint for removing said opposite polarity marking potential.

15. A switching network for establishing interconnection amongst any of a plurality of termination circuits comprising a plurality of switching nodes, predetermined ones of said nodes being associated with respective ones of said termination circuits;

a plurality of links useable in extending a connection path between a calling and called one of said nodes;

means for finding a connection path between a calling and called one of said nodes, said idle connection path finding means including means operable incident to the selection of the next nodes from a given node for determining that next node which lies in the shortest direction path between said calling and called nodes;

means for ascertaining whether said next node has an idle link accessible to said given node;

means for determining whether said next node has an idle link outgoing in the direction of said called node;

means for determining the next node having the least number of budy links; and means for preferring the extension of the connection to a next node having the least number of busy links which node lies in the shortest direction path between said calling and called nodes and which has an idle outgoing link in said shortest direction path.

16. A switching network for establishing interconnections among any of a plurality of termination circuits comprising a plane of switching nodes and links each of said switching nodes being connected to a plurality of others of said switching nodes of said plane according to an iterative pattern of said links which is substantially the same for each of said nodes, means for accruing a count of the number of busy links at each of the nodes subtended by the coordinates of a calling and called one of said nodes in said plane, means operable incident to the extension of a connection path between said calling and called nodes for preferring the selection of a node for inclusion in an incremental portion of said connection path being extended which node has the least number of busy links and which node possesses an idle outgoing link in the shortest distance path between said calling and called nodes.

17. In a switching network having a plurality of switching nodes, a plurality of links between said nodes and crosspoints at each node selectively operable to connect the node to said links, a sleeve lead marking circuit for controlling the extension of switching paths over said links, comprising means operable incident to the selection of any one node for applying a particular polarity marking potential to a sleeve lead of said node, and means operable incident to the selection of the next node in said switching path for applying the opposite polarity marking potential to the sleeve lead of said next node associated with a link from said one mode.

18. A sleeve lead marking circuit according to claim 17 wherein said sleeve lead of said one and of said next node are serially connected and wherein said particular and said opposite polarity marking potential are additively connected to said serially connected sleeve leads.

19. A switching network having a marking circuit according to claim 18 wherein each of said nodes includes threshold voltage means connected between each pair of sleeve leads connectible by one of said crosspoints and wherein said additively connected marking potentials equal the threshold voltage of one of said crosspoints.

20. A switching system for establishing interconnections between a first and a second termination comprising a network having a plurality of switching points each having links to a predetermined number of surrounding switching points arranged in a convoluted array, and a central network control having:

means for ascertaining whether each of the least number of intervening switching points includable between the switching points of the first and second terminations have idle links for inclusion in the interconnection, means for selecting said least number of intervening switching points when each has said idle links, and means for selecting additional intervening switching points when a fully busy switching point is encountered by said ascertaining means.

21. A switching system according to claim 20 wherein said ascertaining means includes means for ascertaining the busyness of a subarray of the links of the switching points between the switching points of the first and second terminations and wherein said selecting means select said switching points in accordance with said busyness.

22. A switching system according to claim 21 wherein said selecting means is arranged to select switching points having the lowest busyness for inclusion in the interconnection.

23. A switching system for establishing interconnections between a first and second of a plurality of terminations characterized by a switching network in which each termination is assigned to a switching point which has links to a predetermined number of surrounding switching points and by a central control for the network which makes up a switching path between the first and second termination by selecting the least number of intervening switching points having idle links includable in the switching path and by selecting additional switching points when a switching point having all includable links busy is encountered.

24. A switching network according to claim 23 further characterized in that the arrangement for making up the switching path of said switching points ascertains the busyness of a subarray of the switching points between the first and second termination and which attempts to make up the switching path by interconnecting least-busy switching points in the subarray.

* * * * *